(12) United States Patent
Barnett et al.

(10) Patent No.: US 7,940,371 B2
(45) Date of Patent: May 10, 2011

(54) INTERACTIVE ZOETROPE FOR ANIMATION OF SOLID FIGURINES AND HOLOGRAPHIC PROJECTIONS

(75) Inventors: David F. Barnett, Simi Valley, CA (US); Lanny S. Smoot, Thousand Oaks, CA (US); Todd P. Camill, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 12/764,186

(22) Filed: Apr. 21, 2010

(65) Prior Publication Data

US 2010/0201949 A1      Aug. 12, 2010

Related U.S. Application Data

(63) Continuation-in-part of application No. 12/202,667, filed on Sep. 2, 2008.

(60) Provisional application No. 61/264,819, filed on Nov. 29, 2009.

(51) Int. Cl.
*G03B 25/00* (2006.01)

(52) U.S. Cl. .............................. 352/101; 352/87; 359/15

(58) Field of Classification Search .................... 352/49, 352/54, 87, 101; 359/15, 26, 23, 22, 25, 359/477, 467, 468, 469; 353/110, 120
See application file for complete search history.

(56) References Cited

U.S. PATENT DOCUMENTS

| 64,117 A | 4/1867 | Lincoln |
|---|---|---|
| 2,913,954 A | 11/1959 | Morgan |
| 3,842,197 A * | 10/1974 | Broussaud et al. ........... 369/103 |
| 3,914,544 A * | 10/1975 | Watanabe et al. ............. 386/114 |
| 3,951,529 A | 4/1976 | Gandia |

(Continued)

FOREIGN PATENT DOCUMENTS

GB     339446     12/1930

(Continued)

OTHER PUBLICATIONS

Smith, Roberta, "It's a Pixar World. We're Just Living in It" The New York Times, 2005, http://www.nytimes.com/2005/12/16/arts/design/16pixa.html?pagewanted-print, retrieved Mar. 10, 2008.

(Continued)

*Primary Examiner* — William C Dowling
(74) *Attorney, Agent, or Firm* — Marsh Fischmann & Breyfogle LLP; Kent A. Lembke

(57) ABSTRACT

A zoetrope configured for user interaction. The zoetrope includes an object support that pivotally supports a holographic disc or other projection element containing a plurality of images. A positioning mechanism rotates the holographic disc at a predetermined speed or positions the projection element in numerous positions. The disc or projection element is illuminated by an illumination source in such a manner as to selectively make the images contained therein be projected in a sequence that provides a projected object that may be animated in an interactive manner based on user input such as voice input. The zoetrope may read out holographic images in response to a user's voice input to project a 3D object that appears to be speaking the words or song input by the user such as by illuminating the disc once per revolution in a particular angular orientation associated with a desired one of the holographic images.

27 Claims, 12 Drawing Sheets

U.S. PATENT DOCUMENTS

| | | | |
|---|---|---|---|
| 4,021,606 A * | 5/1977 | Takeda et al. | 386/96 |
| 4,104,625 A * | 8/1978 | Bristow et al. | 353/30 |
| 4,289,371 A * | 9/1981 | Kramer | 359/569 |
| 5,155,605 A * | 10/1992 | Wreede et al. | 359/24 |
| 5,191,449 A * | 3/1993 | Newswanger | 359/22 |
| 5,548,274 A | 8/1996 | Anderson et al. | |
| 5,870,170 A * | 2/1999 | Pope | 352/101 |
| 6,097,468 A | 8/2000 | Muehlenhard | |
| 6,286,873 B1 | 9/2001 | Seder | |
| 6,353,468 B1 | 3/2002 | Howard et al. | |
| 6,466,372 B1 * | 10/2002 | Morris et al. | 359/567 |
| 6,549,503 B2 * | 4/2003 | Matos | 720/600 |
| 6,575,260 B2 | 6/2003 | Bourget | |
| 7,106,676 B2 * | 9/2006 | Matos | 369/53.21 |
| 7,490,941 B2 * | 2/2009 | Mintz et al. | 353/7 |
| 2001/0013850 A1 | 8/2001 | Sakaguchi et al. | |
| 2003/0048417 A1 | 3/2003 | Rudnick | |
| 2004/0047617 A1 | 3/2004 | Matos | |
| 2004/0130905 A1 | 7/2004 | Olds et al. | |
| 2004/0136293 A1 | 7/2004 | Matos | |
| 2005/0213041 A1 * | 9/2005 | Schmelzer | 352/87 |

FOREIGN PATENT DOCUMENTS

| | | |
|---|---|---|
| GB | 470541 | 8/1937 |
| GB | 2248959 A | 4/1992 |
| GB | 2307561 A | 5/1997 |

OTHER PUBLICATIONS

Zoetrope, From Wikipedia, the free encyclopedia, http://en.wikipedia.org/wiki/Zoetrope; retrieved Mar. 10, 2008.

Mova and Gentle Giant Studios Show First-Ever Moving 3-D Sculpture of Live-Action Performance, 3-D-Zoetrope on Display at Siggraph 2007 Brings to Life Physical Sculpture of Speaking Face, Mova, Contour and Gentle Giant Studios, Aug. 6, 2007, San Diego, Siggraph.

Dickson, Stewart, 3-D Zoetrope, 2000.

Hu, Gigi, "The 7th Hiroshima International Animation Festival" Aug. 20-24, 1998, Animation World Magazine, Issue 3.7, Oct. 1998.

Rovner, Stephen, Sculpture (Including Zoetropes) 2003.

* cited by examiner

INTERACTIVE ZOETROPE FOR ANIMATION OF SOLID FIGURINES AND HOLOGRAPHIC PROJECTIONS

CROSS-REFERENCE TO RELATED APPLICATIONS

This application is a continuation-in-part of U.S. patent application Ser. No. 12/202,667, filed Sep. 2, 2008, and this application also claims the benefit of U.S. Provisional Application No. 61/264,819 filed Nov. 29, 2009, both of which are incorporated herein by reference in their entireties.

BACKGROUND

1. Field of the Description

The present description relates, in general, to visual display assemblies and methods for creating 3D animated imagery with selective illumination of rotating objects such as a holographic disc and/or with selective illumination of a stationary, multiple-image projection element (e.g., a holographic disk, a lenticular lens assembly, or other component that may be used to project differing images when illuminated from differing directions/illumination angles), and, more particularly, to methods and systems for providing an improved zoetrope-based visual effect that provides viewer interaction or that reacts to input from an operator or observer.

2. Relevant Background

Devices for animating sequences of inanimate objects have existed for more than a century. One such device is referred to as a zoetrope, which is generally a device that produces an illusion of animation from a rapid succession of static images or objects. One type of zoetrope includes a vertically positioned cylindrical wall that is perforated by a series of vertical viewing slits that are regularly spaced around its circumference. The interior of the wall provides a surface to support a series of individual images, each comprising an incremental position in the path of movement of a depicted object. When the zoetrope is rotated around the axis passing through its geometric center and running parallel to the viewing slits, the interior surface of the wall may be alternately viewed through the slits and then obscured by the area of the wall between the slits. When viewed through the moving series of viewing slits, each successive image of the moving series supported on the interior surface of the wall is revealed as it reaches the same location where the image preceding it had been revealed.

When the zoetrope is rotated at a sufficient speed, the individual images are revealed for a brief enough period of time that the actual motion of the series is imperceptible, and then obscured for a brief enough period of time so that each image persists in the vision of the viewer until replaced by the image following it in the series. Thus, the zoetrope utilizes a stroboscopic effect to make possible the experience of animation.

Another type of zoetrope achieves a similar effect by using a strobed light source to rapidly illuminate and obscure pictures or three-dimensional (3D) characters that are rotated around a central axis. In one example, a plurality of 3D characters is positioned in concentric rings on the top surface of a circular platform. Typically, each successive character in a ring is the same character but with a slightly altered "pose." When the platform is rotated about its central axis at a sufficient speed, a single light source is rapidly flashed at a rate that causes the rigid 3D characters to appear as if they are animated. Typically, the strobe light used in 3D zoetropes illuminates the entire platform so that all the characters are animated simultaneously. While the characters appear animated because of the rotation, all of the animation for every ring of characters is repeated over and over, and the display is always the same. Hence, while zoetropes have been effective in creating appealing and fascinating 3D visual effects, zoetropes have only been useful for showing a very short, scripted form of action (e.g., a single set of characters that appears due to sequential lighting or viewing). As a result, the uses of zoetropes are limited to displays viewed briefly by visitors who may quickly lose interest or become bored.

SUMMARY

The present description addresses the above problems by providing interactive zoetrope systems and methods adapted for selectively illuminating rotating objects based on input to provide a visual display that varies with or is created based on such input. In this manner, a user or observer may interact or play with a zoetrope for a much longer period of time and remain entertained (e.g., "The zoetrope is reacting to me and the input 1 provide!"). The input typically is audio input such as a recorded song that causes select objects to be illuminated (e.g., in an order differing from their sequential positioning on a platform or presentation within a multiple-image projection element such as a holographic disc). In some preferred embodiments, the audio input is captured in real time from observers of the zoetrope system such that the zoetrope-based display is unique to the observers viewing and interacting with the display. For example, a child may approach an operating zoetrope system of the invention, and, when they speak, a face may be lit in a pattern based on their vocal pattern that causes the face to appear to be speaking with the child and saying the same words and at the same volume (e.g., mouth open more when speaking loudly, mouth open less when speaking softly, and mouth closed when not speaking). The zoetrope system may be a relatively large display such as at a theme park, a theatre, a mall, or the like or be much smaller such as a zoetrope-based video game or display sold to individuals as a retail product.

Briefly, to achieve such an effect, a zoetrope system may include a platform or base rotated on a shaft of a motor. A shaft encoder (analog or digital) or other device may be provided on the motor or shaft to provide an output signal or data representative of the location of the shaft and, hence, the rotating platform at any particular point in time. In one embodiment, a set of objects is mounted at a particular radius (or sets at varying radii) on the base or platform, and the objects within a set typically differ such that their selective illumination creates a desired effect such as to represent a face that is speaking or singing, which can be achieved with 2 to 7 or more differing objects (e.g., faces or heads with at least the mouth in a range of positions between closed and fully open). The zoetrope system further includes an audio input device(s) such as a microphone or the like and a controller or control system/component that uses comparators and/or volume meter chips/devices to determine a magnitude or level of an input audio signal from the audio input device and to trigger a light source to illuminate a particular one of the objects that is associated with that audio input magnitude or level. The location of the object to be illuminated is known or determined based on output of the shaft encoder. For example, a volume meter chip may output an electrical signal indicative of how loud a zoetrope viewer is speaking into a microphone (e.g., at varying levels the meter chip output is used to steer a short pulse of electricity to light a selected object), and a set of comparators may be used to trigger on differing points of a ramp so that a selectable trigger pulse is generated as a particular zoetrope object is rotated by or positioned adjacent a light source.

In one embodiment, the controller or controller system is configured to strobe or pulse the light source such that one of the zoetrope objects is illuminated about 20 to 30 times or more per second (e.g., frames per second for animation effects), and, to this end, the strobe or pulse of light may be in the range of about 200 to 300 microseconds in duration (e.g., pulse width selected to be short enough to freeze the illuminated zoetrope object but not to allow it to appear to smear or streak (unless that effect is desired for a particular implementation)). Note, in some embodiments, the pulse width is kept constant while in other embodiments the pulse width is adjusted (or adjustable) by the controller or control system to achieve a desired effect or to allow an operator to tune operations to create a desired 3D animation effect (e.g., adjust pulse width to better suit the revolution rate or speed of the platform and the platform's size to achieve a more crisp or clean image or to purposely achieve flicker, smearing, or the like). Generally, the platform or base is rotated about 15 to 20 revolutions per second (RPS) such as for smaller platforms of less than about 3 feet in diameter or the like (note, the platform or base does not have to be circular to practice the invention with other shapes used in some cases such hexagonal or other polygonal or even irregular shapes). When larger platforms are used, the rotation rate may not be adequate to obtain a desired illumination rate of 20 to 30 times per second or more. In such cases, the sets of characters or zoetrope objects may be repeated to provide 2, 3, or more sets of the same objects (e.g., repeat a set of faces in varying stages of speech) to achieve the desired illumination or frame rate. In all embodiments, the controller or control system is adapted to know where each of the characters is relative to the light source (or to know where the motor shaft is in its rotation cycle) or to know what "frame" or "object configuration" is opposite the light source provided for that set of zoetrope objects.

The light source is selected and arranged to provide a pinpoint, a spot, or accurate focusing of its output light onto a particular location of the zoetrope system, and the zoetrope objects are rotated through this location or focal point/area of the light source. In some cases, more than one light source is utilized such as when the zoetrope system provides more than one viewer interaction/viewing station about the periphery of the zoetrope base/platform (e.g., more than one controller or controller subsystem may be provided to allow the same set of zoetrope objects to be used to operate in response to or interactively based on audio input from more than one viewer or user in a concurrent manner). In other cases, two or more sets of zoetrope objects may be arranged at two or more radii from the center of the base or platform, and these differing sets of zoetrope objects may be illuminated by differing light sources to achieve a desired effect.

According to another aspect, a visual display assembly is provided for creating an interactive three dimensional (3D) animated display for a viewer. The assembly includes a projection element comprising a plurality of images, and this projection element may be a lenticular lens assembly for selectively displaying one of several interlaced/segmented images, may be a holographic disc for projecting 3D objects, or the like. The visual display assembly may also include a positioning assembly moving the projection element through a number of positions. Since the projection element is being moved, the visual display assembly may also include a position determination assembly determining a present one of the positions for the projection element. In practice, each of the positions corresponds to one of the images such that illumination of the projection element when in one of the positions results in the corresponding image being projected.

The visual display assembly also includes a light source for projecting light onto a surface of the projection element and an input interface receiving input from the viewer and outputting a viewer input signal. Further, the visual display assembly includes a controller periodically operating the light source to illuminate the projection element in response to the viewer input signal and based on the determined position of the projection element. As a result, an object (such as a hologram) is projected that corresponds to one of the images linked to the viewer input signal by the controller. In some cases, the viewer input signal includes an audio signal, and the controller includes a volume detector detecting a volume level of the audio signal. Further, in such cases, each of images may be linked with a range of volume levels, and the controller selects the image to illuminate with the light source from the plurality of images based upon the determined volume level and the linking to the determined volume level (e.g., each of the objects may include a face that is configured to represent the volume level paired with the object).

In one embodiment, the projection element is a holographic disc with a number of differing holographic images encoded in the holographic disc. In this stroboscopic holographic embodiment, the positioning assembly rotates the holographic disc through the number of positions, the positions are angular offsets corresponding to angular positions of the holographic disc during exposure to encode each of the holographic images, and the light source is operated for a time duration selected so as to illuminate only one of the holographic images per revolution of the holographic disc. Further, the images may include at least four different ones (with one useful embodiment having eight) of the holographic images corresponding to differing states of an object such as in stages of speaking or singing. In the assembly, the controller is operable to illuminate the holographic images in a sequence chosen based upon the viewer input signal to project an animated 3D image defined by the sequence and the differing states of the object (e.g., not limited to a scripted and repeated sequence set by how the images are encoded in the disc).

DETAILED DESCRIPTION

Figure 1:
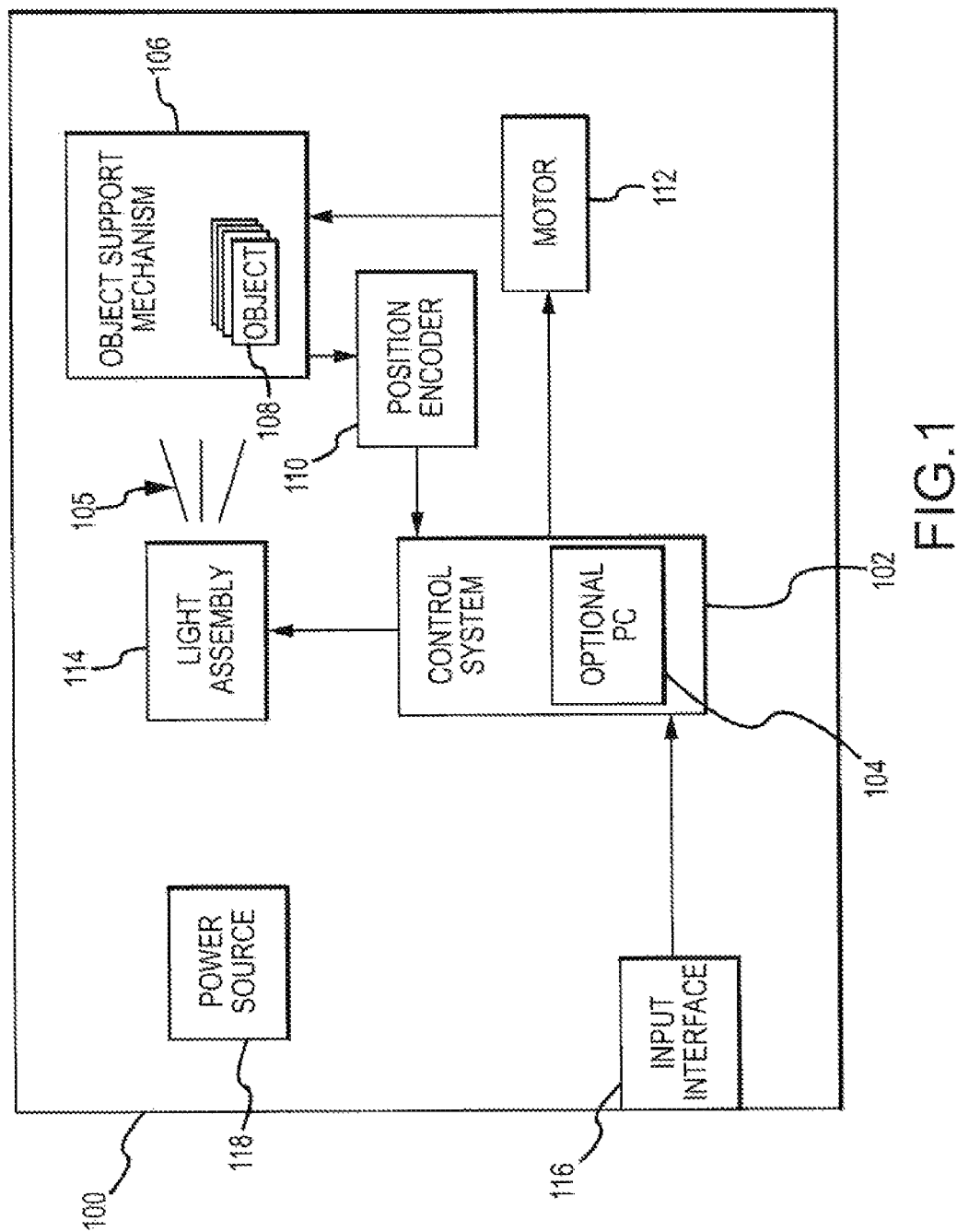
FIG. 1 illustrates a block diagram of an exemplary interactive zoetrope.

Referring to FIG. 1, a block diagram of an interactive zoetrope or zoetrope system 100 is shown that provides viewers with a 3D visualization of one or more objects and may include features that allow storytelling, gaming, and other interaction with viewers. The zoetrope 100 includes an object support mechanism (OSM) 106 (e.g., a disk or platter) that supports a plurality of 3D objects 108 such as figurines or characters. A motor 112 is coupled to the OSM 106 and is operable to cause the OSM 106 to rotate at one or more velocities, which may be predetermined and/or adjustable during operations of zoetrope 100. The motor 112 may be controlled by a control system 102, which receives real-time position and/or velocity information about the OSM 106 from a position encoder 110 and, in some embodiments, uses the information to cause the motor 112 to adjust the rotational speed of the OSM 106. The control system 102 may further control a light assembly 114 that is positioned so that it may illuminate one or more objects 108 on the OSM 106 in such a manner that the objects are quickly illuminated and obscured as they rotate on the OSM 106 so that they appear to move or be animated (i.e., rotomation). The light assembly 114 may include one or more individual light sources that may be strobed or pulsed for short durations (e.g., 200 to 300 microsecond pulses or the like). The zoetrope 100 may also include an input interface 116 that is coupled to the control system 102. As discussed in more detail below, the input interface 116 may be operable to receive external signals (e.g., audio, video, control, or the like) from operators and/or viewers/users of the zoetrope that are used by the control system 102 to modify the operation of the zoetrope 100. Further, to provide power to the various components of the zoetrope 100, a power source 118 may be included. The power source 118 may include batteries, power supplies, power conditioners, and/or other components typically used to provide power to electronic devices.

The control system 102 may be a combination of hardware and software that is operable to perform the control functions for the zoetrope 100. For example, the control system 102 may include a processor, memory, I/O ports, displays, or the like. As shown, the control system 102 may include an optional personal computer (PC) 104 that may provide additional features such as allowing updating of software, adding new features, or the like.

The OSM 106 may support the plurality of objects 108 that are spaced apart in predetermined positions typically in concentric circles or rings a set radius from a rotation or central axis of the support mechanism 106. The control system 102 may then cause the motor 112 to rotate the OSM 106 at a predetermined velocity (e.g., 20 to 30 rotations per second (RPS) or more or less in cases of repeated characters/objects to achieve a desired frame rate). As the OSM 106 is spinning, the control system 102 may cause the light assembly 114 to selectively illuminate and then obscure (e.g., objects are typically not visible when they are not illuminated) one or more objects 108 on the OSM 106 in such a manner that it appears to a viewer that the objects 108 are animated or are moving/changing position. As discussed above, this may be achieved by using temporal aliasing (also known as "stroboscopic effect"). As an example, if the OSM 106 is rotating at a constant rate, then the objects 108 may appear to be stationary if the light assembly 114 flashes light 105 on the objects 108 at the same rate (which may be used by the control system 102 when the audio or other input from input interface 116 is substantially constant or within a preset range associated with a particular one of the characters or objects 108 such as for keeping a mouth closed when no input is received or wide open when a high audio level is received over a period of time and so on). If the flashing rate of the light assembly 114 (or the speed of the rotating OSM 106) is slightly adjusted, the objects 108 may appear in different locations during each revolution or differing ones of the objects 108 may be illuminated in successive sets of revolutions (e.g., illuminate one object 108 and then another one of the objects 108), which will create the illusion that the objects 108 are moving or are animated. It should be appreciated that the timing of the flashes of light 105 and the rotational speed of the OSM 106 may be dynamically and interactively adjusted to create desirable effects, as discussed in the examples provided below.

The input interface 116 may be used by the control system 102 to permit a user to interactively control the animation of the objects 108 of the interactive zoetrope 100. For example, the input interface 116 may include one or more buttons, a video game controller/pad, a touch screen, or the like that permit a user to change the animation sequence or play a game with the control system 102 operating the light assembly 114 to illuminate objects 108 responsive to the input from the user. As another example, the input interface 116 may be operable to sense movements of a user and the movements may be translated by the control system 102 into changes in the animation (e.g., a character's hands move in the same way as a user's hands). In the example discussed below in relation to FIGS. 2 and 3, the animation sequence of the objects 108 is controlled to correspond to characteristics of a user's voice or based on audio input. Those skilled in the art will readily recognize that the input interface 116 may be operable to receive other forms of external signals to enable the zoetrope 100 to be interactive and is not limited to audio interactivity.

Figure 2:
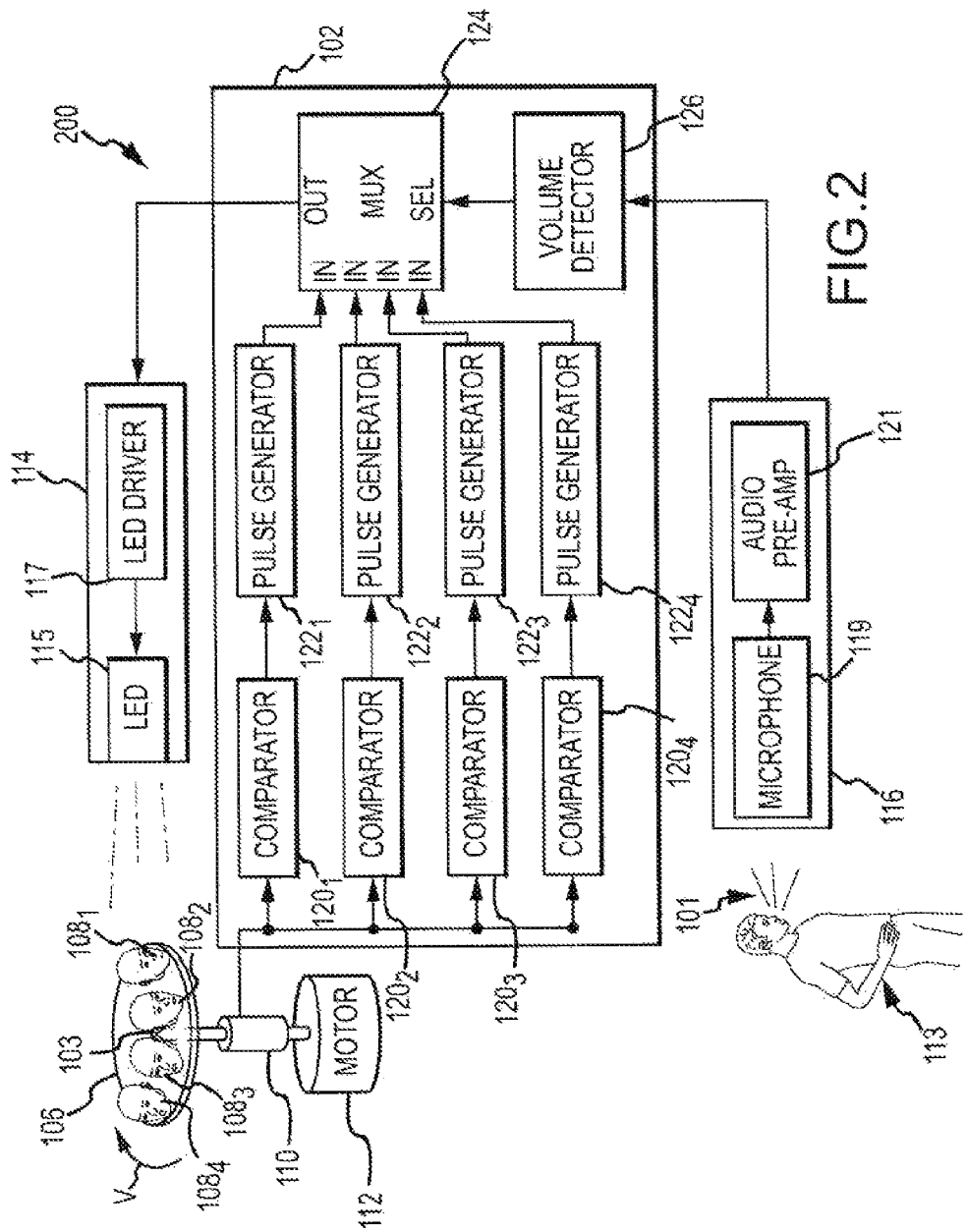
FIG. 2 illustrates an audio-controlled interactive zoetrope.

FIGS. 2 and 3 illustrate an exemplary interactive zoetrope or zoetrope system 200. Components that are similar to those shown in FIG. 1 are identified with the same reference numerals. As shown in FIG. 2, the zoetrope 200 includes a disk 106 that supports a plurality of 3D character faces $108_{1-4}$. Each of the faces $108_{1-4}$ corresponds to a person speaking at progressively louder volumes, with $108_1$ representing a person that is not speaking or is whispering and $108_4$ representing a person that is speaking loudly. The disk 106 is coupled to a shaft 103 that is in turn coupled to a motor 112 that is operable to spin the disk 106 at a predetermined velocity (V) (e.g., about 20 to 30 RPS or more).

To selectively illuminate the faces 108, a light assembly 114 is included and is positioned proximate to the disk 106. The light assembly 114 may include an LED driver 117 that drives an LED 115. As discussed above, the LED 115 may be flashed at a rate and duration such that one face 108 is illuminated each revolution of the disk 106. In other words, a single face 108 may appear stationary to a person viewing the zoetrope 200 while the others are obscured or not illuminated (e.g., LED 115 strobed to illuminate 108, for a number of revolutions while a viewer/user 113 is not talking or providing audio input 101). Generally, the zoetrope 200 operates to create an illusion of a single face 108 that is animated in real-time at a viewing station (e.g., one of the objects 108 is illuminated each revolution of the disk 106 at a particular location such as adjacent or opposite the LED 115 or in the focal zone or area of the LED 115) to correspond to the volume of a person's 113 voice 101 that is spoken into an input interface 116. For example, when a person is speaking loudly into a microphone 119 of the input interface 116, the zoetrope 200 illuminates only the face $108_4$, which is the character that has a facial expression of a person speaking loudly. The details of the operation of the zoetrope 200 are discussed below.

In one embodiment, a position encoder 110 (e.g., an analog shaft encoder while other embodiments may use digital encoders) is coupled to the shaft 103. The position encoder 110 is operable to output an analog ramp signal that correlates to the rotational position of the shaft 103 (and, therefore, the position of the disk 106). For example, the position encoder 110 may output a minimum voltage when the disk 106 is at a first position and a maximum voltage when the disk 106 is rotated about 359 degrees from the first position. This ramp signal from the position encoder 110 is then fed to a bank of four comparators $120_{1-4}$ inside or part of the control system 102. The four comparators $120_{1-4}$ are each configured to output a signal when the respective faces $108_{1-4}$ are aligned with the LED 115. For example, the comparator $120_1$ is configured to output a signal when the position encoder 110 outputs a voltage that corresponds to the position of the disk 106 when the face $108_1$ is directly in front of the LED 115. As can be appreciated, each of the comparators $120_{1-4}$ will send an output signal once per revolution of the disk 106.

Each of the output signals from the comparators $120_{1-4}$ is sent to respective pulse generators $122_{1-4}$, which are operable to receive an output signal from the comparators $120_{1-4}$ and immediately output a pulse signal of a predetermined duration. The duration of the pulse may be selected to be sufficiently short such that the faces $108_{1-4}$ do not appear to move during the time that they are illuminated (e.g., 0.2-0.3 millisecond pulse widths). In this regard, each of the pulse generators $122_{1-4}$ outputs a pulse signal once per revolution of the disk 106 during the time when a corresponding face $108_{1-4}$ is positioned in front of the LED 115. The outputs of the pulse generators $122_{1-4}$ are then fed into the inputs of a multiplexer 124, which is operable to select one of the pulses from the pulse generators $122_{1-4}$ and output the selected pulse to the light assembly 114. The LED driver 117 of the light assembly 114 then powers the LED 115 when it receives a pulse from the multiplexer 124.

In order to determine which of the faces $108_{1-4}$ should be illuminated at a given time, the multiplexer 124 is coupled to the input interface 116 through a volume detector 126. In operation, the user 113 speaks and provides audio input or an acoustic signal 101 to a microphone 119 of the input interface 116. Next, the signal from the microphone 119 may be amplified by an audio pre-amplifier 121 and fed into the volume detector 126. The volume detector 126 is operable to receive the audio signal and output a digital signal that corresponds to the volume of the audio signal. For example, the volume detector 126 may output a binary 0 if the volume of the signal is very low, corresponding to a person whispering (e.g., 20-40 dB), and a binary 3 if the volume of the signal is very high, corresponding to a person shouting (e.g., 80-100 dB). It should be appreciated that other analog and digital techniques may be used to detect the volume of a user's voice (or magnitude or level of audio input 101). The multiplexer 124 then outputs a pulse to the light assembly 114 that corresponds to the face $108_{1-4}$ that is selected by the volume detector 126 as an approximation of the user's voice. In this manner, the zoetrope 200 is adapted to be interactive and, in response to audio input 101, to operate to illuminate one of the objects 108 during each revolution of disk 106 such that the user or viewer 113 is in effect controlling or creating the display or visual effect with their input 101. In other words, the zoetrope 200 operates responsively to audio input 101 to create a 3D animated display that is not predefined or scripted but instead varies over time and in real time based on user input and interaction (e.g., the faces $108_{1-4}$ may be illuminated in non-sequential order to display a speaking or animated object in an interactive manner based on user input 101 (here, audio, but the invention is not limited to audio input) to input interface 116).

Figure 3A:
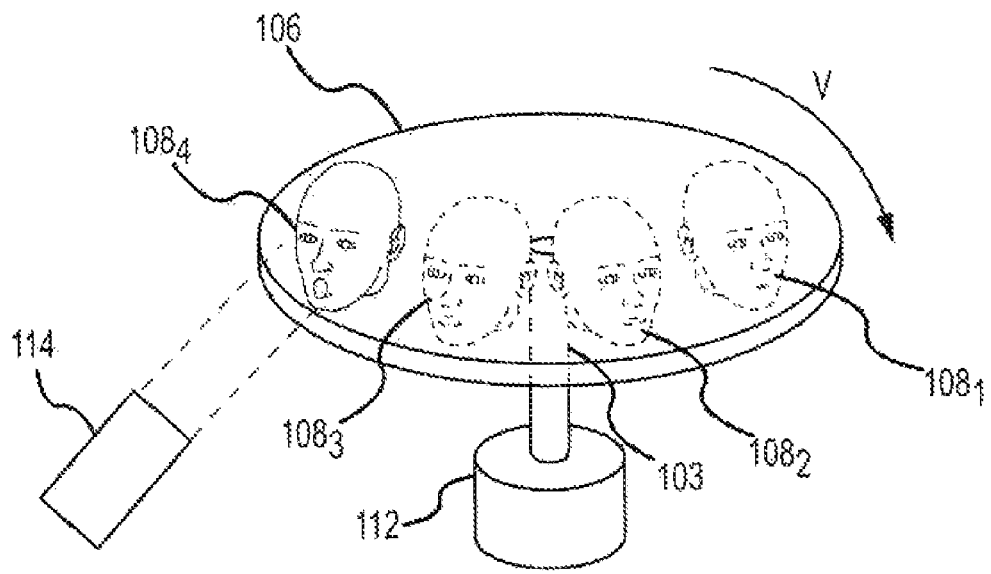
FIGS. 3A-3B illustrate the operation of the zoetrope shown in FIG. 2.
Figure 3B:
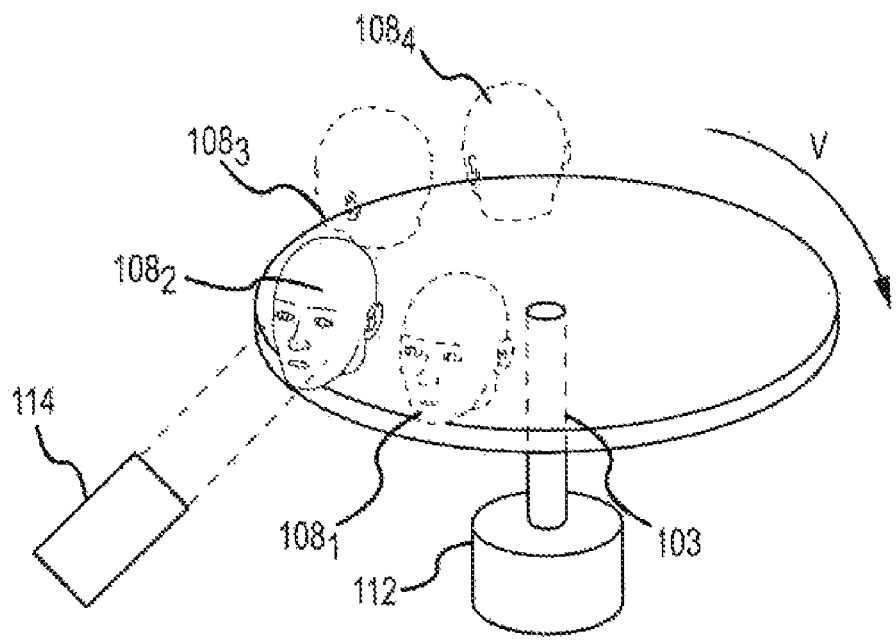

FIGS. 3A-3B illustrate the operation of the zoetrope 200 when the user 113 is speaking loudly (FIG. 3A) and softly (FIG. 3B). As shown in FIG. 3A, the light assembly 114 is controlled to flash a pulse of light each time the face $108_4$ passes in front of it as the disk 106 is spinning. As indicated by the dashed lines, the other faces $108_{1-3}$ are not illuminated and therefore are not viewable by the user 113 when the disk 106 is spinning. FIG. 3B shows the same effect but at a time when the user 113 is speaking at a lower volume than the example shown in FIG. 3A. In this regard, the face $108_2$, rather than the face $108_4$, is illuminated each revolution by the light assembly 114. It should be appreciated that because the disk 106 may be rotating rapidly (e.g., velocity, V, up to about 35 RPS or faster), it is possible for the zoetrope 200 to react quickly to changes in volume of the user's voice, so that it appears to the user 113 that the faces $108_{1-4}$ are tracking the volume of the user's voice in real-time. Further, as discussed below, the zoetrope 200 may be configured to detect other characteristics of a user's voice and translate those characteristics into movements by the characters.

The zoetrope 200 may further include speech recognition features that enable a larger number of characters to simulate the speech of a user talking or singing into the input interface 116. For example, a large number of faces (e.g., 15, 30, or more faces) may be provided that represents a large range of facial expressions and emotions. Through the use of audio or video recognition, the zoetrope 200 may be operable to select and display a face that most closely represents the facial expression or emotion of a viewer in real time. The audio or visual recognition may be provided through software, hardware, or a combination thereof. For example, if the zoetrope 200 incorporates speech recognition, software may be operable to recognize the spoken words of a viewer and to select a series of faces that, when viewed in succession, give the appearance that the face is speaking those same words in real time.

It should be noted that multiple light assemblies 114 may illuminate the face of a single character. Thus, it is possible to use one assembly to light the eye-height area of a character, one assembly to light the nose-height area, and finally a third assembly 114 could light the mouth-height area. In this manner, portions of a face can be "swapped" for other portions (e.g. raised eyebrows can be substituted for lowered eyebrows, while keeping the same mouth position).

Additionally, by slightly varying the timing (phases) of illumination signals to the high, low, and middle lighting assemblies 114, a single character could be made to appear to separate-along horizontal cleaving planes, and to waver left and right in a resemblance of a "Star Trek" transporter effect.

In a related embodiment, lighting assembly 114 may be handheld. In this case, a user may move the stroboscopic lighting around to discover the current position of an object on the platter (all objects not specifically lit, will appear to be invisible).

Additionally, a shooting type game may be realized wherein users are given strobed "guns" that fire bursts of collimated light. If these bursts are determined to have hit a character (for example, through the use of a photo sensor timed to only receive light scattered from a particular character at a particular position and only at the time when the user "fires" his gun), then, that character may be instantaneously swapped (by a change in timing of the light assembly) with a similar character which shows damage due to the hit.

The zoetrope 200 may implement the aforementioned features using any combination of hardware and/or software. For example, rather than using comparators, pulse generators, and multiplexers, a microprocessor may be used to perform the functions of the control system 102. In this regard, a digital shaft encoder may be provided that outputs a digital signal that represents the instantaneous position of the shaft 103 (and therefore the disk 106), which may be used by the microprocessor to control the operation of the light assembly 114. Those skilled in the art should readily recognize that there may be various ways to implement the features of the zoetrope 200.

Figure 4:
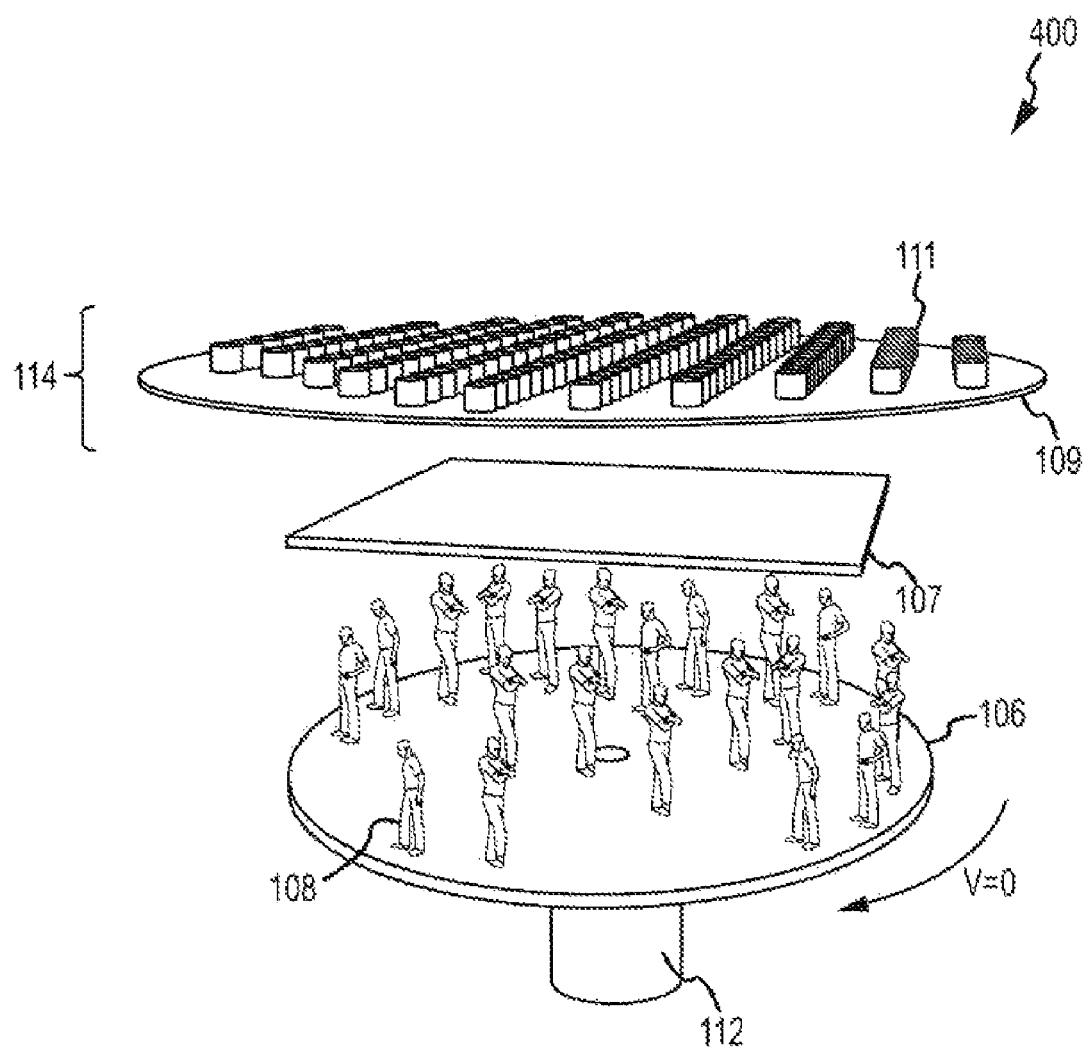
FIG. 4 illustrates another exemplary interactive zoetrope.

FIG. 4 illustrates another interactive zoetrope 400 that includes a motor 112 that is operable to rotate a disk 106 that supports a plurality of characters 108. In this embodiment, light assembly 114 includes an array of independent LEDs or other lights 111 that are positioned on a glass shelf 109 that is mounted over the characters 108. The light assembly 114 may be operable to independently control the timing, phase, color, and pulse duration of each individual LED 111. Further, the zoetrope 400 may include a lens 107 (e.g., a Fresnel lens or the like) to focus light from the LEDs 111 on one or more characters 108. Although the light assembly 114 is shown mounted above the characters 108, it should be appreciated that the light assembly 114 may be positioned in other locations (e.g., below the disk 106, with lights 111 positioned inside the individual characters 108, or the like).

By using an array of light sources, rather than a single light source, a number of features may be implemented. For example, one or more characters 108 may be illuminated individually, while others are kept in darkness. This feature permits the zoetrope 400 to display animations that are much more complex than previously known zoetropes. For example, the animation sequence may last longer (e.g., multiple revolutions) than a single revolution, which allows for interactive storytelling or gaming. Further, previously unseen characters 108 may appear after a time has passed in the animation sequence. Additionally, characters 108 may be "reused" in other positions (e.g., provide objects of a single character or pose at differing radii) such that a single character 108 may represent multiple roles. These and additional features are further discussed in the examples provided below.

Figure 5A:
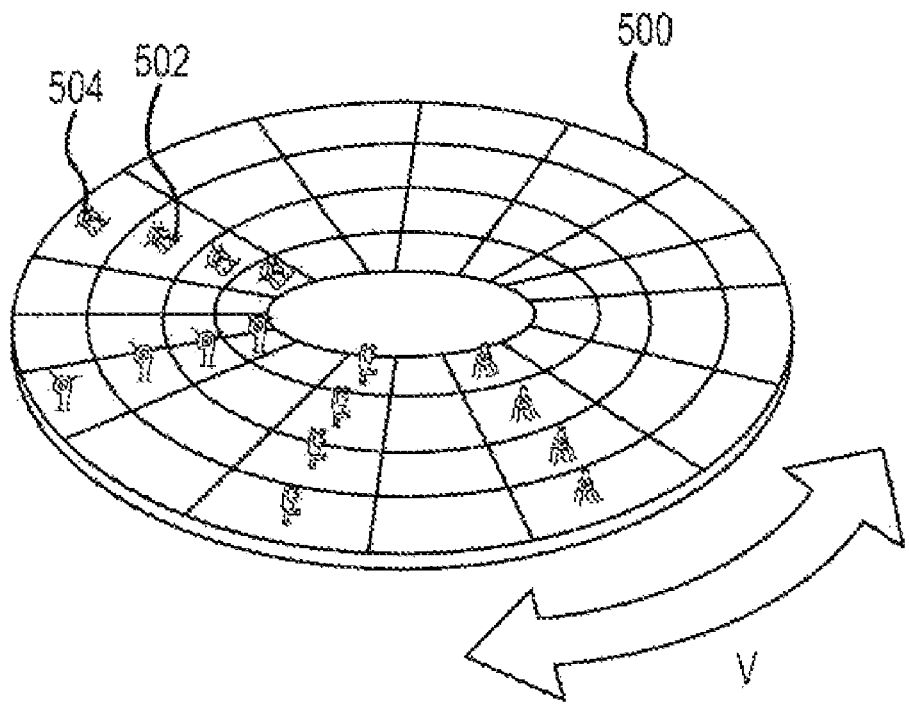
FIGS. 5A-5B illustrate a game that utilizes an interactive zoetrope.
Figure 5B:
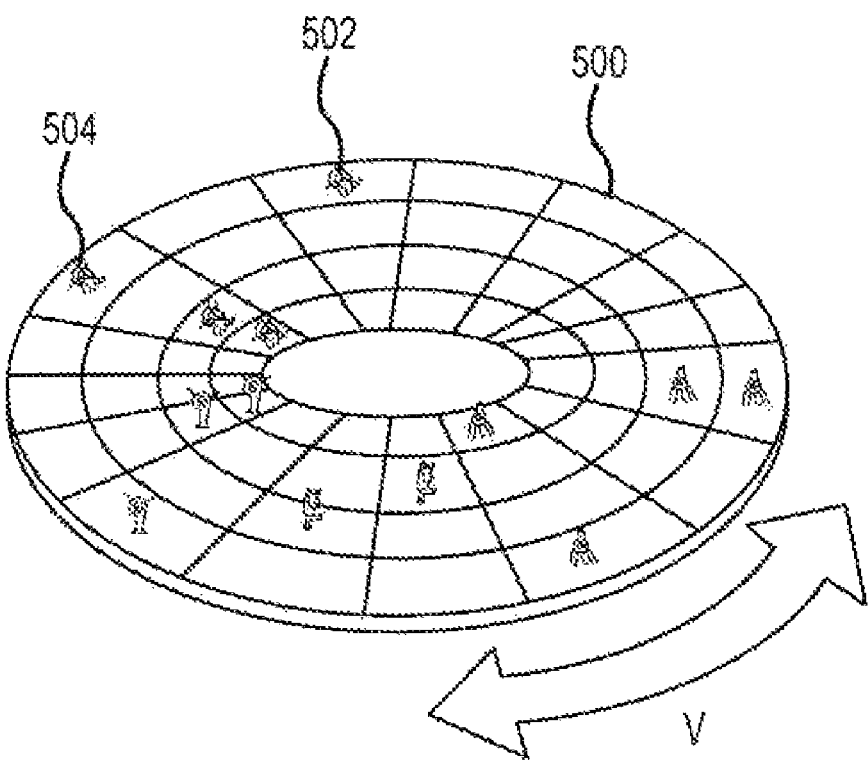

FIGS. 5A-5B illustrate a game that utilizes the features of the zoetrope 400 to selectively light characters on a disk 500 (e.g., one, two, or more (and even all) of the characters/objects may be illuminated at anytime). In this embodiment, a zoetrope system is provided with the disk 500 including a plurality of characters (e.g., characters 502 and 504). When the disk 500 is spinning at a velocity (V), the characters are illuminated by a light source by methods described above with reference at least to FIG. 4 to provide the illusion that the characters are stationary on top of the disk 500. In operation, game players may input various "moves" into a control system of the zoetrope, which causes the illusion that the characters (e.g., characters 502 and 504) are moved on the playing surface 500. In this regard, a game may be played by "moving" the characters according to the rules of a specific game (e.g., chess, checkers, ping pong, or the like). For example, two or more players may each be provided with an input device (e.g., a keypad, joystick, touch screen, or the like) that allows them to selectively choose the position of one or more characters that reside on the playing surface 500.

In the illustration provided in FIGS. 5A and 5B, the characters (e.g., characters 502 and 504) may appear to be stationary at all times except when a player instructs the system to move a character from one position to another position on the playing surface 500. In response to a player instruction, the control system of the interactive zoetrope may cause the character to "instantaneously" transport to a new position on the player surface 500. Alternatively, the control system may cause an illusion that the character is slowly moving from one position to the next in an animated fashion (e.g., walking from one position to another, hopping, etc. . . . ). Further, the zoetrope may add and remove characters from the playing surface according to actions made by the players. As an example, when the zoetrope is used to implement a chess game, the zoetrope may remove a character (e.g., a pawn) when one player "captures" it.

The techniques used by the zoetrope 400 may also be used to implement a game that requires more interaction than the board game illustrated in FIGS. 5A and 5B. For example, in one embodiment, the zoetrope is configured to allow multiple players to play a game of ping-pong with each other. Players may be provided with a game controller that permits them to individually control a character of the zoetrope in real time. In operation, the control system of the zoetrope receives input from each game controller (e.g., character movements, swinging a paddle, or the like) and uses the inputs to cause an animation of the fixed characters and ping pong balls that appears to viewers to be 3D characters playing a game of ping-pong. The zoetrope may reuse individual characters as they spin around the disk so that one character may represent more than one animated "ping-pong player." Further, the zoetrope may illuminate the different characters using different colors of lights to allow players to distinguish one animated character from another.

Figure 6A:
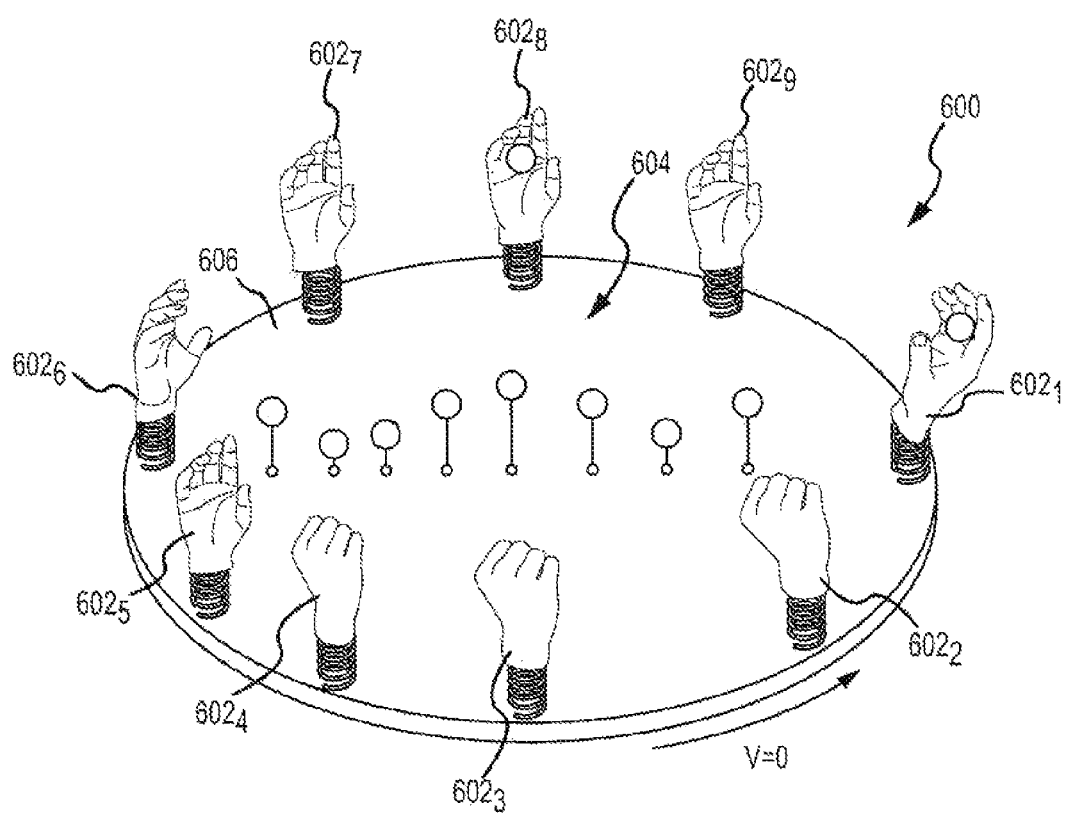
FIGS. 6A-6B illustrate another exemplary interactive zoetrope.
Figure 6B:
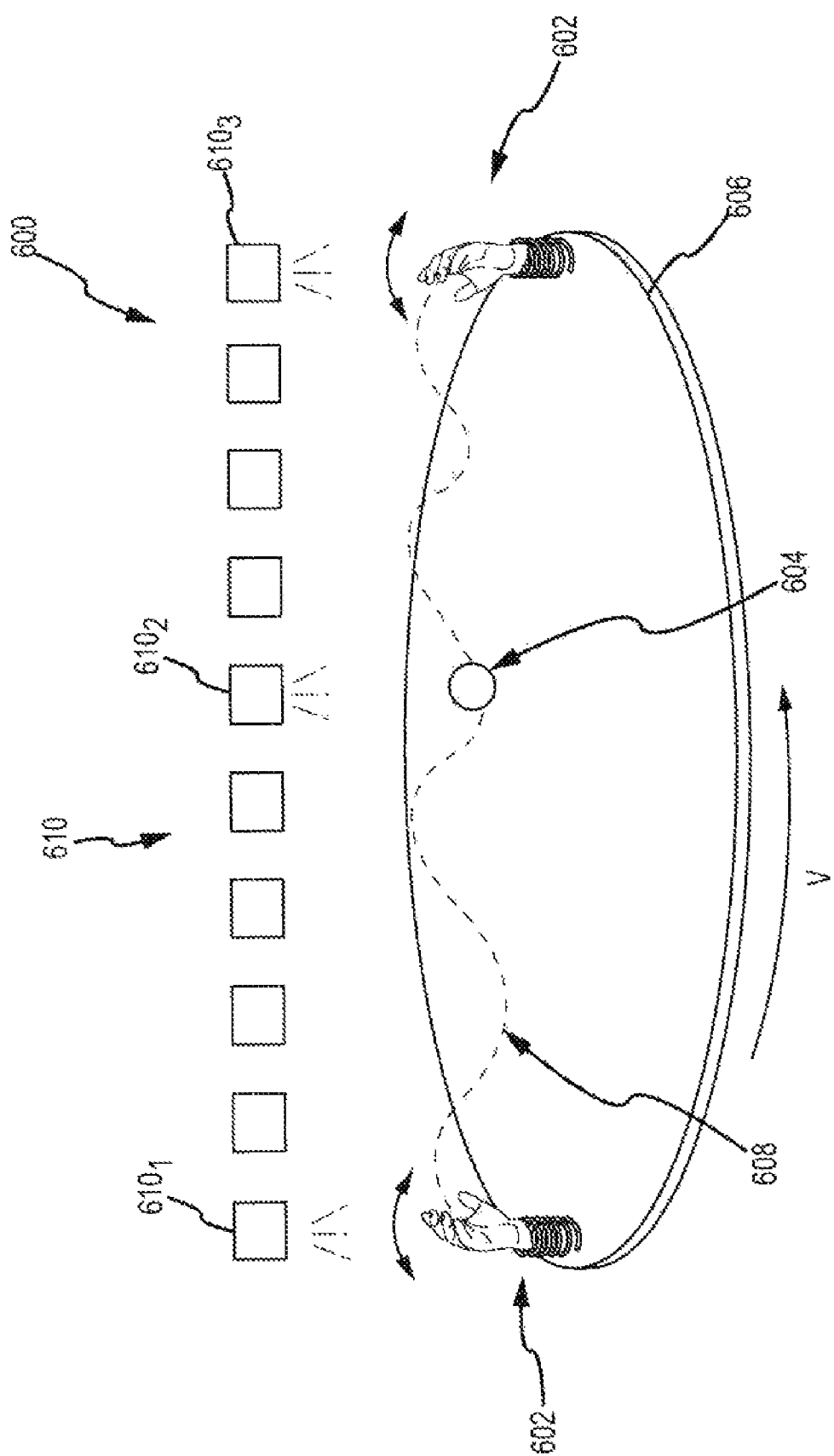

FIGS. 6A-6B show another embodiment of an interactive zoetrope 600. FIG. 6A illustrates the zoetrope 600 when it is not rotating, while FIG. 6B illustrates the zoetrope 600 when it is spinning at a velocity (V) (e.g., 20 to 30 RPS). In operation, the zoetrope 600 provides the illusion of two hands 602 throwing a ball 604 back and forth to each other from opposite ends of a disk 600. To achieve this illusion, a plurality of hand characters $602_{1-9}$ is positioned in a ring of a given radius from the rotation or central axis of the disk or platform 606 such as at the edge of the disk 606. Each of the hands $602_{1-9}$ is slightly different (e.g., placed in a differing pose or configuration) from the others and represents the motion that a hand makes when throwing and catching a ball 604. Further, the zoetrope 600 includes a plurality of balls 604 that is positioned along a line in the disk 600 at various heights along a "path" that the ball may appear to travel between the hands 602.

FIG. 6B illustrates a snapshot of the zoetrope 600 when it is spinning and providing the illusion. As shown, a light assembly 610 is positioned over the disk 606. The light assembly 610 includes a plurality of light sources (e.g., $610_{1-3}$) that are positioned to illuminate individual figures or objects (e.g., the hands $602_{1-9}$ and the ball 604). In this snapshot, the light sources $610_1$ and $610_3$ are illuminating the hands 602 at each end of the disk 606, while the light source $610_2$ is illuminating the ball 604 along its path indicated by the dashed lines. The arrows above each of the hands 602 indicate that the hands appear to be animated to a viewer. This is achieved by selectively controlling the timing of the light assembly 610 to illuminate different hands 602$_{1-9}$ in such a manner as to cause the appearance of hands throwing the ball 604 back and forth across the disk 606.

The zoetrope 600 may be interactive, permitting a player to press a button to cause one hand 602 to throw the ball 604 to the other hand on the opposite side of the disk 606. Further, the zoetrope 600 may include multiple input interfaces that allow multiple players to interact with it. In one embodiment, multiple players can each control a hand 602 that appears to be stationary at one position of the disk 606 (e.g., one hand for each player spaced apart around the edge of the disk 606). The players may each be provided with a controller that permits them to control the "movement" of the hand, including throwing a ball to one of the other hands that is operated by a different player. In one embodiment, the zoetrope 600 may be used to provide a virtual game of "hot potato," where players each control a hand 602 to "throw" a ball around a circle while music is played, wherein the player whose hand is holding the ball when the music stops is out of the game (e.g., the zoetrope 600 remove the hand in that player's position by not illuminating it). Subsequent rounds of hot potato may be played until only one player is left. As in the examples provided above, it should be appreciated that the individual hands 602$_{1-9}$ may be reused by the zoetrope 600 to create the illusion of multiple hands (e.g., one for each player) by individually illuminating the hands 602$_{1-9}$ at each position where a player's hand is to be displayed. For example, at the beginning of the game, it may be desirable that the hands for all of the players to be in the same pose (e.g., the pose of the hand 602$_6$). The zoetrope 600 may cause one hand (e.g., the hand 602$_6$) to be illuminated when it passes by each position where each player's hand is to be displayed, providing the effect that there are multiple hands that are all in the same pose.

Although FIGS. 6A-6B illustrate a simple embodiment of an interactive zoetrope, many other variations are contemplated. In one embodiment, an interactive zoetrope is used to implement a multiple player hockey game. In this regard, multiple players are provided with game controllers that permit them to control one or more "hockey player" characters. The zoetrope may include a platform with a plurality of characters that resemble hockey players in various poses, as well as a plurality of hockey pucks disposed in various positions on the platform. In operation, the platform may be rotated at a velocity V (e.g., 20 to 30 RPS, or more) and the zoetrope uses the inputs received from the multiple players to selectively illuminate individual hockey player characters and individual hockey pucks to provide the illusion of a hockey game. To enable the reuse of characters for different hockey teams, the zoetrope may illuminate characters for each team with different colors (e.g., red team vs. blue team). It should be appreciated that other interactive animations may be implemented as well. For example, the techniques described herein may be used to provide a more complicated multi-player game such as boxing, tennis, baseball, or the like. Alternatively, the techniques may be used to illustrate an interactive story, whereby users can control the animations by inputting commands (e.g., using a keypad, touch screen, or the like) into the control system of the zoetrope.

In another example, a zoetrope may be operable to receive external audio and/or video signals and create the illusion of performers performing songs or actions that were input into the zoetrope. Such signals may be created in real-time by humans, or may be stored in various files (e.g., mp3, WAV, or the like). In one embodiment, a zoetrope includes figurines that represent characters in a musical band. The zoetrope is operable to receive music signals from an external source and create the illusion that the 3D figurines are performing the song being played. The external source may be devices that provide signals to the zoetrope in real-time, such as a microphone, a musical instrument, or a game controller that represents a musical instrument (e.g., drums, guitar, or the like). Further, the zoetrope may be configured to receive and playback prerecorded audio files. For example, the zoetrope may include storage (e.g., a disk drive, flash memory, or other storage device) for storing music files. Additionally or alternatively, the zoetrope may include an interface that permits users to provide prerecorded songs. As an example, the zoetrope may have an interface (e.g., USB, wireless, or other suitable interface) that permits users to couple a personal music player (e.g., an MP3 player) to it so that the songs may be played back and illustrated by animated characters.

The zoetropes described herein may include multiple viewing stations where multiple viewers may view the same or different animation sequences. In one embodiment, a single zoetrope has a plurality of viewing windows spaced apart along an outer edge. Each of the viewing windows may display separate interactive animations that are based on inputs received from viewers at each window. In this regard, the characters of the zoetrope may be reused for each viewing window to create individual interactive animation sequences, so that multiple users may simultaneously view and interact with the zoetrope.

The size of each individual zoetrope may vary considerably depending on the application for which it is intended. For example, a zoetrope that is to be used at a theme park may be several feet (e.g., 3 feet, 20 feet, or more) in diameter to permit viewing and interaction by multiple viewers. Alternatively, zoetropes that may be provided for individual entertainment may be much smaller, such that they may be placed on a table top or hand held.

Figure 7:
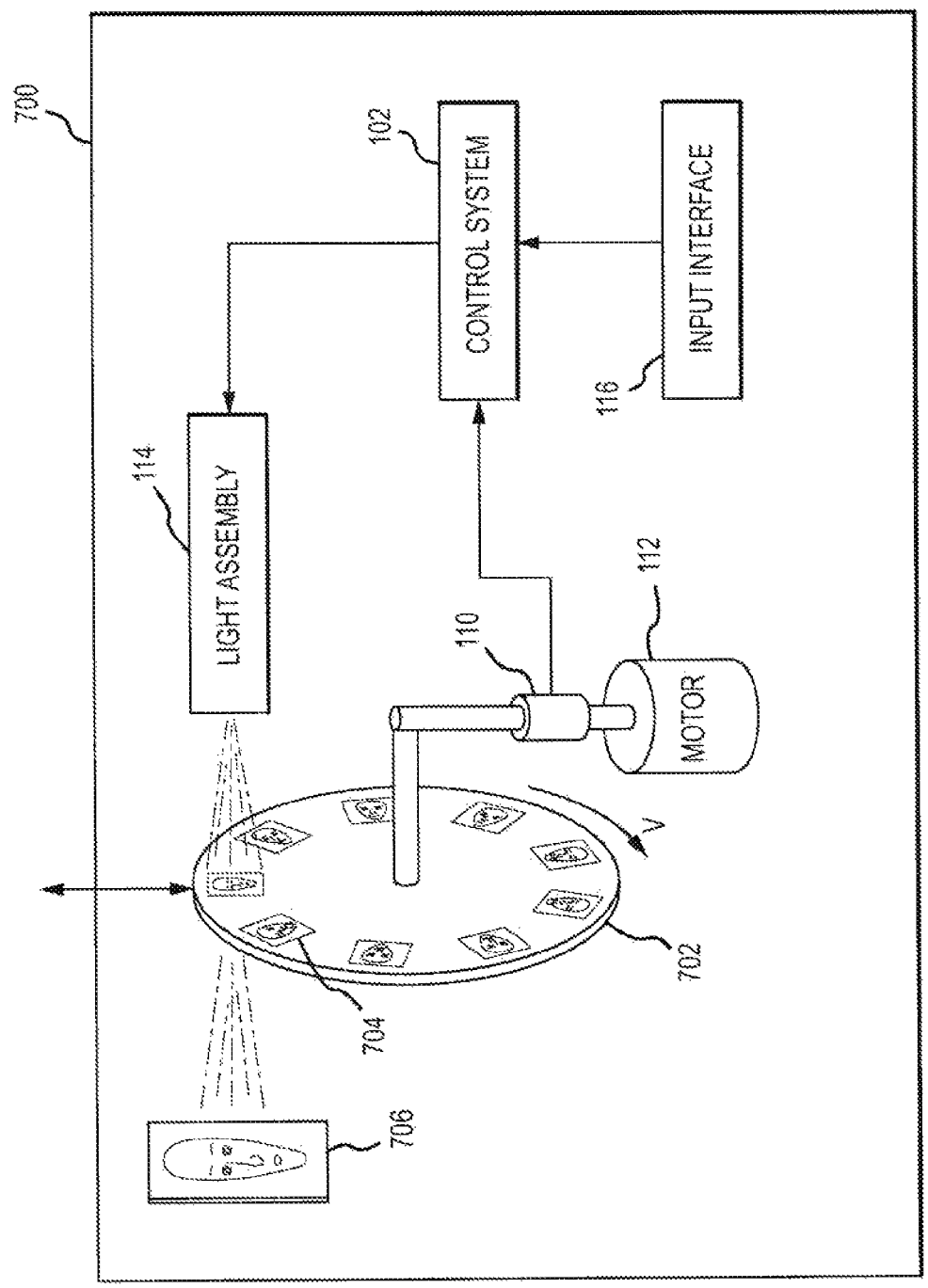
FIG. 7 illustrates another embodiment of an interactive zoetrope.

FIG. 7 illustrates another embodiment of an interactive zoetrope 700 wherein components that correspond to components shown in FIG. 2 are labeled with corresponding reference numerals. The zoetrope 700 may be included as part of a consumer device (e.g., a clock radio, a toy, or the like) or may be standalone. The zoetrope 700 includes a disk 702 that is coupled to the motor 112 and may rotate at a predetermined velocity V (e.g., 20 to 30 RPS, or more). The disk 702 includes a plurality of images 704 disposed on an at least partially light transmissive base (e.g., slides) that depict a series of faces with different facial expressions. In operation, the light assembly 114, which may include an output objective lens (not shown) to focus the light from light assembly 114 having passed through disk 702, is used to selectively illuminate one or more of the slides 704 during each revolution of the disk 702 in such a way that an animated image appears on a projection surface 706. Similar to previously described embodiments, the zoetrope 700 includes an input interface 116 that is operable to receive signals that may be input into the control system 102 to control the animation sequence. For example, the input interface 116 may receive audio signals from a viewer 113, from an internal or external memory (e.g., a disk drive, CD, or the like), or from any other source (e.g., a broadcast radio station, a network, or the like).

Although the projection surface 706 is shown to be integrated into the zoetrope 700, it should be appreciated that the projection surface may be an external object, such as a wall, ceiling, screen, or the like. Additionally, one or more optical elements (e.g., lens, filters, or the like) may be included to achieve desirable projections. Further, in one embodiment, a projection surface is not included, and a viewer may directly view the animation by looking at the slides 704 as they are selectively illuminated by the light assembly 114. In this "direct view" embodiment, the light assembly 114 essentially functions as a backlight for the animations.

As shown by the arrow above the disk 702, the disk may be selectively removable from the zoetrope 700. This may be desirable to allow a viewer to change the animation that is displayed by the zoetrope 700. For example, a plurality of disks 702 that include slides that each show different characters may be used with the zoetrope. Further, the input interface 116 may be configured to receive signals that uniquely correspond to different disks 702. For example, a viewer may insert a disk 702 that has a plurality of images of a character making various facial expressions. The zoetrope 700 may be adapted to identify a characteristic of the unique disk 702 that is inserted, and to modify the animation accordingly (e.g., associate different audio streams with different disks 702). The zoetrope 700 may use any method to identify the disk 702, including but not limited to optical scanning, unique shapes or patterns of disks, or the like.

Additionally, the zoetrope 700 may be operable to utilize externally supplied signals to control the animation sequence. For example, in one embodiment, a viewer may couple a storage medium (e.g., a CD, a USB storage device, or the like) to the zoetrope 700, and the input interface 116 may use data on the storage medium to control the animation. In this manner, viewers may purchase numerous different interactive animations that may be played on the zoetrope 700.

Although a disk 700 is shown in FIG. 7, it should be appreciated that other structures may be utilized to selectively move a plurality of related images in front of the light assembly 114. For example, the images may be disposed on the walls of a structure that has the shape of a hollow cylinder, such that the light assembly 114 is disposed within the cylinder and illuminates the images from within the cylinder to form a projection outside of the cylinder. Alternatively, the images may be disposed on a filmstrip that is configured to circulate the images in front of the light assembly at a predetermined rate. Those skilled in the art will readily recognize that other techniques may be used to achieve the desired functionality described above.

In a related embodiment, the light assembly 114 may be a small solid state laser, and the disk 702 may contain a sequence of small diffraction gratings, each encoded with an image 704 for projection. Diffraction gratings may produce a full projected image when even a very small portion of their area is illuminated by a traversing laser beam, thus the disk 702 containing the images 704 may be reduced in diameter such that its radius is the width of the illuminating laser beam. Accordingly, each separate image may take up no more rotational space than the width of the laser beam. In this case, the inventive interactive zoetrope may be miniaturized so that it can fit into a handheld item such as a writing pen. Since images produced with diffraction gratings and lasers have an essentially infinite depth of field, the light emerging from such a handheld zoetrope can be displayed on any convenient surface such as a wall or a ceiling. The handheld pen-like zoetrope projector may (as in the case of previously described embodiments) contain a microphone to provide instantaneous local interactivity or may have stored audio or direct animation data so as to provide a "pre-rendered" show.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

As can be seen from the discussion of the solid figurine zoetrope (e.g., the zoetropes 100 and 200 of FIGS. 1 and 2), the described display techniques provide a number of improvements over prior zoetrope devices. Prior zoetropes displayed their images sequentially, i.e., in the order in which the image or solid figurines were physically placed or arranged within the zoetrope (e.g., on a spinning cylinder or disc). In contrast, the zoetropes described herein provide techniques to instantaneously vary the order in which the images are displayed, which allows one to change the course of the animation in real time (such as in response to user input including audio input). This allows for infinitely non-repetitive and non-trivial animation using a small, finite number of solid figurines, images, and/or frames.

Control over the light assembly (and/or of the drive for the multiple-image projection element to position the solid figurines/images) may come from a predetermined script or media track. However, in many implementations, control is provided based on receipt and/or processing of direct human intervention (e.g. user input) in real time. For example, solid figures having faces with differing mouth positions (degrees of openness, for example) may be caused to talk or sing as the various mouth positions are lit or illuminated by selective operation of a light assembly (to drive an LED or other point source of light) in an order corresponding to the average level of a voice-audio signal.

One example of an interactive zoetrope includes use of solid figurines as shown at least with objects 108 in FIGS. 1 and 2 (and discussed in detail above). It may be useful at this time to describe one such zoetrope fabricated by the inventors to demonstrate the effectiveness of their interactive zoetrope to animate such figurines based on audio input from a user. In the prototype zoetrope, whimsical faces with closed-to-fully open mouths were drawn on ping pang balls that were then affixed onto a small platform (e.g., at a radius about a central axis of the platform), which was configured for rotating as described with reference to FIGS. 1 and 2. A rotary shaft encoder was used to provide an analog ramp signal at the rate of 1 ramp/revolution. The ramp was applied to eight separate analog comparators with variable thresholds to allow adjustable timing along the ramp.

The zoetrope characters do not need to be physically in any particular order as the system/zoetrope simply is adjusted so that the proper character is illuminated based on an incoming control signal once per revolution (e.g., not played or lit sequentially, which would require placing in a preset order on the platform). To accomplish this, the comparator outputs were fed to eight, 300 μsec one-shot pulse generators that provide strobe pulses short enough to freeze (via short periods of operation of the light source) the motion of the rotating figures, e.g., at around 18 revolutions per second with a 30-cm diameter platter/platform. The pulses are individually gated such as by 8 CMOS switches whose control inputs are sourced by a single-chip, audio-level meter. The chip and switches are used to route a chosen strobe pulse to a driver for a single, high-power LED, which acts as the strobe light source in the zoetrope prototype. In the case of this solid figurine zoetrope, a person's speech or audio input into a microphone causes selective illumination of the solid figurines (or the faces on such figurines) that acts to cause the animated/illuminated face on the figurines (ping pong balls) to mimic speech (the user's talking mouth movement).

It was found that the zoetrope was readily adjusted or modified to make it possible to try different configurations and types of physical objects on the rotating platform or platter. A number of experiments were completed using 2D paper cutouts supported by L-brackets, including actual photographs of a person with increasing levels of smile/grin (e.g., to mimic facial movements/emotions rather than speech). Cartoon characters were also easily animated using the described techniques. Based on these prototypes, it is believed that a more refined zoetrope may be crafted using figurines of very high detail and/or stereo-lithographic maquettes (e.g., originating as 3D CGI figures) to provide repeatable, frame-accurate animation. As discussed above (e.g., with reference to FIGS. 4-5B), use of the described illumination or display techniques allows two or more completely independent "characters" to come to life on the same platter/platform using separate strobes to illuminate separated character positions on the platter/platform. Each strobe/light source may be driven by an independent pulse control circuit to respond to user input (or other input/control signals).

The overall frame rate in the prototype and embodiments of zoetropes described herein is typically synchronous with rotation speed. The system is configured to operate properly at all speeds up to its maximum rotation speed. Typically the system will provide one lit image per rotation of the platter or platform at each animation location or viewing station. The light assembly may use a point source such as an LED to provide very localized animation lighting, which may be useful to allow maquettes or figures separated by only a small distance (e.g., a few millimeters) to be illuminated crisply and individually.

In fabricating and experimenting with the solid figurine prototype, it was realized that the zoetrope illuminating techniques were not limited to use with solid objects or figurines on a rotating platform. Instead, the stroboscopic illuminating technique in response to user input may be used with nearly any projection element that is configured to display two or more images or objects. For example, the rotating platform may be replaced with a multiple image projection element that is configured for displaying two or more holograms (e.g., 3D projected images or objects).

The projection element may in some embodiments be a holographic disc (or object) that is encoded with (or is fabricated to contain) two or more holographic images that can be selectively projected when backlit or frontlit, such as via strobed point sources that are positioned at the same angle as the holographic images or via a single point source with the holographic disc being rotated to properly orientate the holographic images in the disc. The illumination path may be linear, curved, zigzag, or any other illumination direction or path. The multiple image projection element may be formed using a variety of imaging technologies such that the element (or projection assembly) contains more than a single frame. For instance, the multiple image projection element may take the form of a lenticular lens assembly or lenticular display device that includes a lenticular lens layer paired with an image layer containing segmented images. Then, by coding each image to be read out or displayed by a point or linear light source at different physical locations (or by moving the lenticular display device or a mirror in front of the display device), the lenticular-based projection element may be selectively illuminated to display one of the sets of segmented images to display (or allow viewing) of projected images in any desired order (e.g., to animate a displayed image in response to user input such as audio input). When an interactive zoetrope uses integral imaging techniques (e.g., with an array of lenses over imagelets or segmented images in a plane), the projection element may be illuminated at differing angles and from one or more locations to practice the zoetrope display techniques taught herein (e.g., to make different ones of a set of images appear in front of or behind the lenticular array or projection element).

Figure 8:
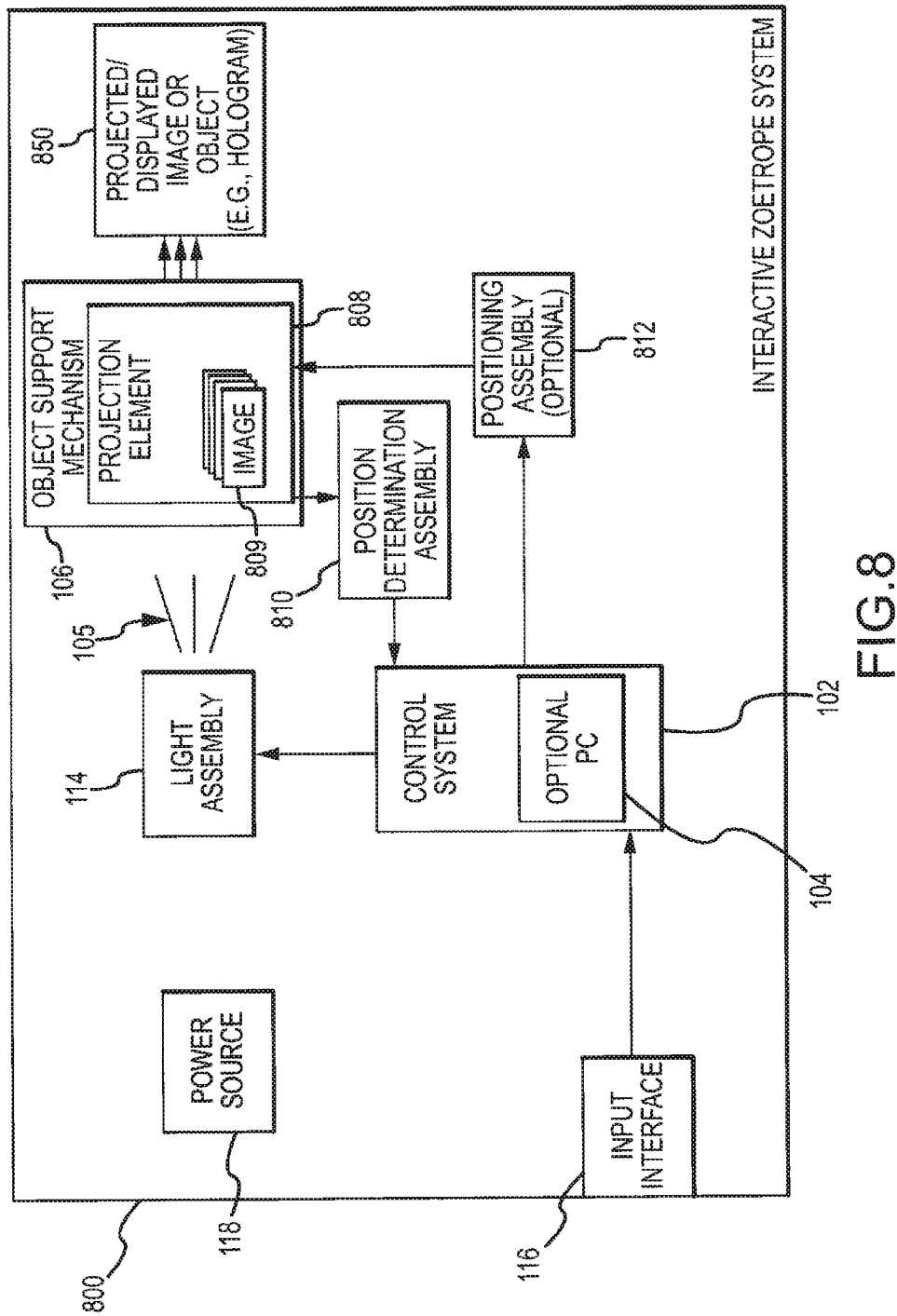
FIG. 8 illustrates a block diagram of another exemplary interactive zoetrope system, similar to FIG. 1, showing use of a multiple image projection element to display or project an image or object (such as a 3D image or hologram).

With these expanding concepts in mind, an interactive zoetrope system 800 may be provided as shown in FIG. 8 by modifying or building upon the systems 100 and 200 shown in FIGS. 1 and 2 (with like numbered components having similar functions and not described in detail below). In the interactive zoetrope system 800, an object support mechanism 106 may be utilized to support a projection element 808. The projection element 808 is configured, as discussed above, for projecting or displaying an image or object 850 when illuminated with light 105 by selective operation of light assembly 114 by controller 102. The projected image or object 850 is created by lighting one of two or more images 809 contained within or provided in the projection element 808. In other words, the project element 808 is encoded or configured with images 809 to be a multiple image projection device such as a holographic disk or device encoded with images 809 to selectively project a 3D object or holograph 850. In other cases, though, the projection element 808 may be a lenticular lens assembly with an interlaced image providing the images 809 that can be selectively illuminated (or read) by light 105 from light assembly 114 to provide the displayed/projected images 850.

The interactive zoetrope system may include a positioning assembly 812 when the projection element 808 is rotated or otherwise moved (e.g., angular orientation relative to the light assembly 114 being adjusted) to position the projection element relative to the light assembly 114 (or a particular source within the assembly 114). The positioning assembly 812 for example may include a motor to drive a shaft as discussed with motor 112 of system 100. In other cases, the motor of assembly 812 may be used to turn a pulley that drives one or more drive belts to rotate the projection element 808 (or a supporting portion of the OSM 106). For example, the pulley (s) and belt(s) of the positioning assembly 812 may be used to rotate the projection assembly 808 when it is configured as a holographic disc encoded with the images 809 so as to provide a plurality of illumination axes or illumination directions relative to light assembly 114 (e.g., to have light 105 provide an angle of incidence that coincides with that used to encode the images 809 in the disc 808). As discussed above, the speed of rotation may be such that it provides a desired shutter rate (e.g., a velocity of 15 to 20 revolutions per second or more).

The zoetrope system 800 also includes a position determination assembly 810 that is used to track or determine the particular orientation of the projection element 808 (and, hence, of the images 809) and provide a signal or position data to the control system 102, which, in turn, controls the light assembly 114 to selectively illuminate particular ones of the images 809 to provide the projected image or object 850 (e.g., illuminate one per image 809 per revolution or one image 809 per preset time period (e.g., a 20 to 30 times per second strobing to provide a desired frame rate for desirable animation of the images 809 in the projected image 850 so illuminate each image 809 for a period of about 200 to 300 microseconds)). The position determination assembly 810 may take the form discussed with reference to systems 100 and 200 when the positioning assembly 812 includes a motor that is used to drive a shaft connected to a platter. In other cases, though, the position determination assembly 810 may take other forms (discussed below) for use in mapping a location of the images 809 for display by light 105 (or to know the orientation of the projection element 808 to access the images 809 to produce the images such as to create a particular hologram 850).

Figure 9:
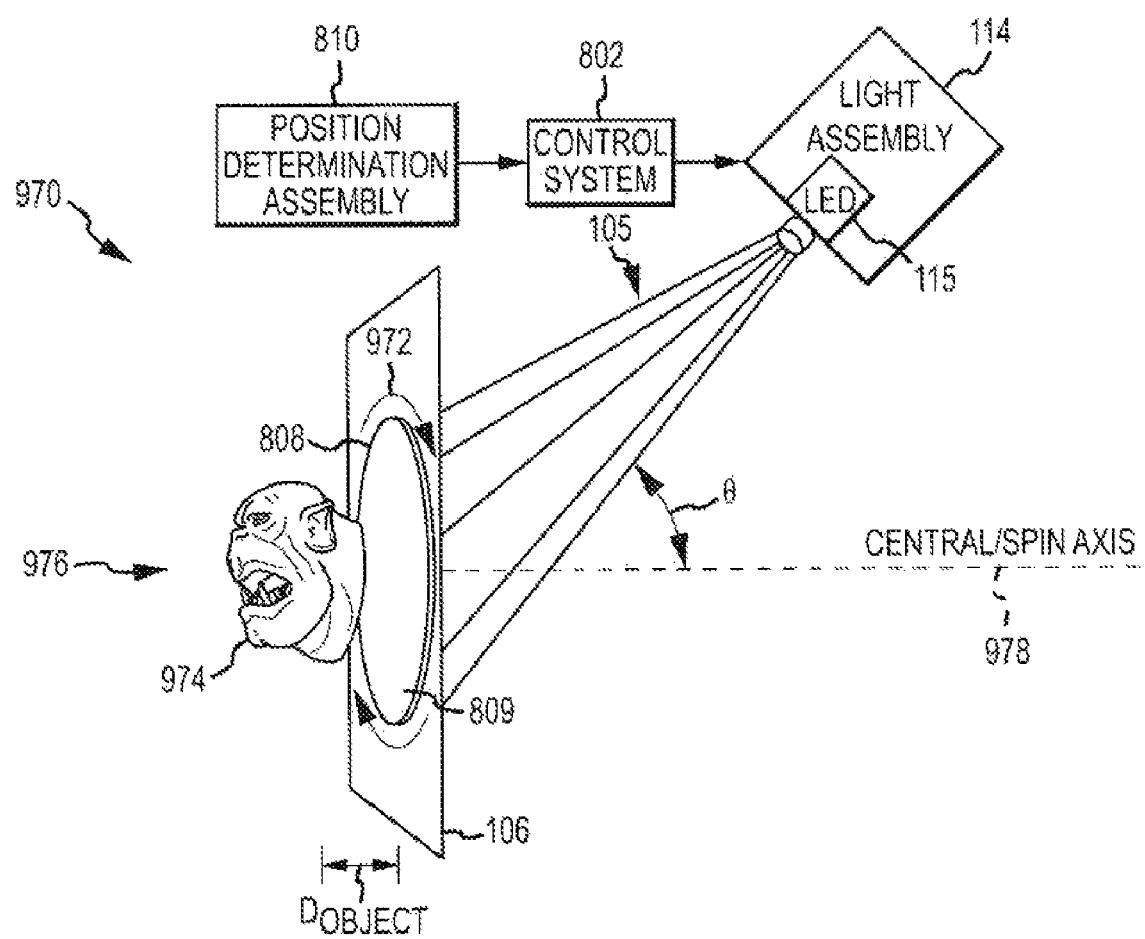
FIG. 9 illustrates one implementation of the interactive zoetrope system of FIG. 8 showing use of a holographic disc that may be spun or rotated and selectively illuminated when at differing angular orientations to produce an animated hologram.

With these ideas in mind, the inventors fabricate an additional prototype of the interactive zoetrope system (e.g., system 800 of FIG. 8) that utilizes a spinning, rear-illuminated holographic disk as the projection element 808. A portion of such an interactive zoetrope system 970 is shown in FIG. 9. As shown, a holographic disc 808 is rotatably mounted and supported on the object support mechanism 106 such as with its planar body arranged vertically (e.g., perpendicular to the ground although this is not required to use system 970). The holographic disc 808 is configured or fabricated to have a number of differing images 809 that allow a projected hologram (or holographic image) 974 to be animated in response to user or other input to control system 102. In one embodiment/prototype, the holographic disc 808 has eight separate talking-head images 809 encoded within it (or provided in the body of the projection element 808).

During operation, the disc 808 is rotated as shown at 972 about its central or spin axis 978 by the positioning assembly 812 (not shown in FIG. 9) such as at a velocity of about 15 to 30 revolutions per second. The position determination assembly 810 operates to determine the current orientation of the holographic disc 808 (e.g., determine which of the images 809 will be projected as hologram 974 if the LED 115 of light assembly 114 is used to illuminate the disc 808). This position or angular disc orientation information is passed from the assembly 810 to the control system 102, which acts based on user input to operate the light assembly 114 such as in response to audio input from a user or the like to selectively illuminate one of the images 809 per revolution of the disc 808 with light 105. The light 105 is provided at a reference angle, θ, that matches the angle used to impart the images 809 into the disc 808 during its fabrication/encoding (e.g., holograms 974 are viewable via a view direction 976 when a point or other source 115 of light 105 is directed from the same angle, θ, as a laser beam or the like is used to expose a holographic plate or disc 808 during exposure by each image 809, with the plate rotated some angular offset between exposures on its axis 978). For example, the reference or incidence angle, θ, of the light 105 may be about 40 to 65 degrees or the like, with one prototype using 56.3 degrees for the off-axis light 105. This results in projection of an animated hologram 974 that is a distance, $d_{Object}$, from the front surface of the disc 808.

As noted, the zoetrope 970 uses a spinning, rear-illuminated holographic disc as the projection element 808. The holographic disc 808 may have eight talking-head images 809 encoded in it that may be read out (as shown with holographic image 974) by use of an off-axis beam of narrowband light 105 (e.g., diffuse light is typically not as useful for projecting holograms 974). As the holographic disc 808 is rotated 972 through a 45-degree angle about its axis 978, which causes a change to the angle to the disc's back surface of the incident light 105 from light source 115, the image "chosen" by the control system 102 is one of the eight different head/faces 974. If the disc 808 were to be rotated with static illumination, an image would appear to move in a tilted arc until it centers itself in the field of view and then continue to move along the arc as the disc 808 continues to rotate 972. However, since the movement is of the images is continuous with rotation 972, a stroboscopic technique may be used by the control system 102 (or its operation of the light assembly 114 and its LED(s) 115) to freeze the images 974 and overlay a stationary but animated sequence (or animation responsive to live user input in some cases).

Figure 10:
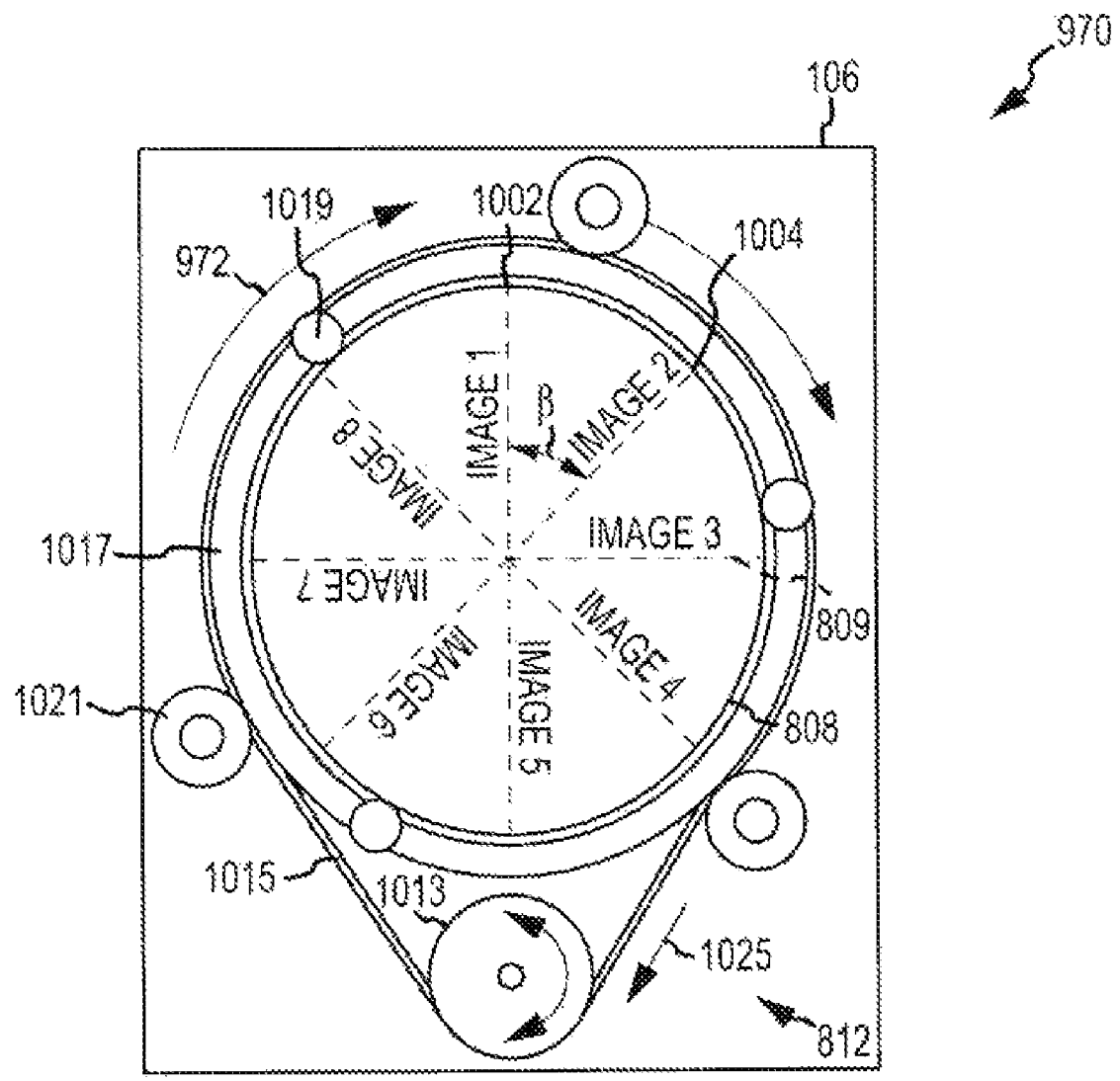
FIG. 10 illustrates a portion of the interactive zoetrope system of FIG. 9 showing more details of the positioning assembly useful for rotating the holographic disc to allow selective illumination of encoded holographic images in the disc.

FIG. 10 illustrates the zoetrope system 970 from the rear or back side, i.e., the side that would be hidden from a viewer and illuminated by the light assembly 114 during use. The holographic disc 808 is shown to be pivotally supported on the object support mechanism 106, which here includes a planar mounting structure (such as a portion of a wall or a display wall). The support mechanism 106 may include a ring 1017 with a hole for receiving the disc 808 and allowing light to pass through the support mechanism 106. Mounting hardware 1019 may be used to rigidly affix the disc 108 to the ring 1017. The ring 1017 and contained disc 808 are pivotally supported on three (or more) wheels or rollers 1021, which may have tracks or recessed surfaces for allowing a belt or other drive member 1015 to pass between the wheels/rollers 1021 and the edges of ring 1017.

The holographic disc 808 contains, in this embodiment, eight differing holographic or 3D images 809 of a face or head in differing states of speech (or showing differing emotion). This is shown schematically with dashed lines labeled Image 1, Image 2, and so on to Image 8. Each of these images may be viewed by aligning the holographic disc 808 with the dashed line associated with it at the vertical top of the interactive zoetrope system 970 (e.g., with the line at 12 o'clock or noon or pointing vertically upward). For example, each of the images 809 may have been encoded at 45-degree offsets during the disc's manufacture, i.e., the disc 808 was rotated about its axis 45 degrees between exposures to images 809. Hence, as shown, Image 1 of the images 809 would be projected because the point 1002 corresponding to the top of line Image 1 is at the top most vertical position of the disc 808 in the system 970. When the disc 808 is rotated as shown at 972, it can be seen that the previous image 809 that could have been illuminated was Image 2 when the point 1004 was at the 12 o'clock position. As shown, each image 809 is encoded at equal offset angles, β, which is 45 degrees when 8 images are included but may vary to practice the system 970 (e.g., 90 degrees when 4 images are included and so on). Of course, the images 809 do not have to be encoded at equal angular offsets, but such an arrangement may simplify determination of angular position or orientation of the disc 808 during rotation 972 by the position determination assembly 810 (not shown in FIG. 10).

To rapidly rotate the holographic disc 808 and maintain a clear viewing zone through it, the system 970 uses a circular turntable approach with ring 1017 holding the disc 808 pivotally supported by three grooved rollers 1021 on the platform of support mechanism 106. A protruding ring may be provided on the outer edges of the ring or disc holder 1017 and run in the grooves of the rollers 1021. A drive pulley 1013 may be driven by a motor of the positioning assembly (neither shown in FIG. 10 for simplicity sake) and a drive belt 1015 may extend about the pulley 1013 and the outer surface/edge of the ring or disc holder 1017 to rotate 972 the disc 808 when the pulley 1013 is rotated as shown with movement 1025 of the drive belt 1015 about the pulley 1013.

In the system 970, the same type of LED-based strobe lighting system may be used as was taught for the solid figurine embodiment (as explained above with reference to FIGS. 1 and 2 and the like). For example, the light assembly 114 with LED 115 may be operated by the control system 102 to provide the illuminating light 105 in a strobed manner to freeze select ones of the holographic faces 809 as shown with projected holographic image 974 (shown in FIG. 9). In one embodiment, the position determination assembly 810, since it was difficult to attach a rotary shaft encoder to the disc 808, was implement implemented by optically indexing the disc 808 by placing a tab at one point on its edge. A constant current source charge of a capacitor was then used to derive a ramp signal that was then applied to the comparators as in the case of the earlier described zoetropes (e.g., see zoetrope 200 of FIG. 2).

As shown in FIG. 9 via view direction 976, a user of the system 970 is presented with a talking character via projected and animated holographic image 974. As with all rear-illuminated holographic techniques, there is some leakage of undiffracted illumination that may be shielded from the user. Since this illumination is off axis (e.g., 45 to 65 degrees off central/spinning axis 978 as shown with light beam 105 with reference/incidence angle, θ) and is coming from above at a single point (e.g., with the light source 115 positioned above the axis 978 and directed downward at angle, θ), it can be conveniently deflected towards a floor (or ceiling in other cases where the light source 115 is directed upward at the reference angle, θ) The sources of illumination for the holographic zoetrope 970 typically are narrowband and monochromatic (e.g., a single color LED 115 as shown in FIG. 9).

To provide interactive holograms 974 with system 970, the holographic disc 808 generally is fabricated to include two or more images that can be selectively illuminated to provide an animated, 3D image 974 (e.g., an image that changes over time or over revolutions of disc 808 such as in response to user input or other input). It may be useful at this point to describe one specific, but non-limiting, implementation of a useful holographic disc 808. In one embodiment, the holographic disc 808 was a planar glass (or plastic, ceramic, or other light transmissive material) disc that was 30 centimeters in diameter and 6 millimeters thick. The disc 808 was encoded with several (e.g., 2 to 8 or more) separate/differing images of a talking head.

When illuminated by light 105 from the light assembly 114, each projected image or object 974 (8 differing talking heads in one prototype) appears to float a distance, $d_{Object}$, i.e., 15 centimeters in one prototype, in front of the holographic disc 808. The holographic images 809 in the disc 808 are analogous to the figures described for the solid figurine zoetropes 100, 200, with ever increasing mouth openings (differing talking states) and accentuated facial speech cues (e.g., eyes, eye brows, and other facial features changed to match mouth position).

The images 809 on the disc 808 were CGI-rendered to take full advantage of holography's ability to express 3D without the need for special glasses or other viewing aids. An initial but removable limitation of the holographic technology constrained the color gamut of the output light 105, and, in one embodiment, the light 105 was green. Therefore, the images 809 used to create the projected holograph 974 were designed to take best advantage of the technology. For example, one embodiment included images 809 of a fanciful character (e.g., an imaginary creature) with an overly large mouth (that appeared well in green light) and with extremely fluid facial features that varied widely between the images 809 to accentuate cues indicating speech (e.g., to animate the image/object 974 to a larger degree).

In one embodiment, the holographic faces 809 were designed using a commercial computer animation package. For each of the eight faces 809, a model was depth segmented using a moving wall renderer and recording the depth segments sequentially in a single volumetrically multiplexed master hologram. These master holograms were then copied using rotational multiplexing with 45-degree incremental rotations between masters (e.g., between exposures). All holography was performed in the phase transmission mode on silver halide film using collimated, P-polarized, 532 nm off-axis reference light at a 56.3-degree reference angle.

Upon replay by illuminating the disc 808 with light 105 from LED 115, the faces 809 in disc 808 appear as a series (when the disc is rotated at 45 degree increments matching the exposure offsets) of real 3D images 974 within a volume 19 centimeters wide by 19 centimeters high by 12 centimeters deep that is centered about 20 centimeters in front of the disc 808 and with a viewing angle of 50 degrees vertically and horizontally.

In some cases, it may be desirable to provide an interactive zoetrope without having to rotate a platform or rotate a projection element. The use of a holographic disc as the multiple image projection element allows for such a zoetrope system. In other words, another embodiment of an interactive holographic zoetrope system may be constructed using a holographic disc similar to that described for system 970 (e.g., using the same disc 808 or a similar device with two or more encoded holographic images therein). This second embodiment may differ in its non-stroboscopic read-out method. Specifically, instead of rotating the holographic disc, the light source is "rotated" in effect by providing a plurality of light sources positioned at angular positions relative to the central axis of the holographic disc to provide illuminating/read-out light that is off-axis to read out or project each of the images (off-axis at a reference angle matching the encoding/exposure angle and direction).

A primary difference and advantage of this type of holographic zoetrope (as compared to the prior stroboscopic or rotating holographic zoetrope) is that it may be constructed without moving parts. The holographic disc used in one embodiment displays one of eight different erect images (or with a common side/portion uppermost such as a top of a face/head in the talking character head implementation) corresponding to the angle from which it is illuminated. Rather than a single light source as used in system 970, eight separate light sources are employed surrounding the holographic disc, with one source at each of the reference angles specified (or matching) for each of the particular encoded holographic images. In this system, the control system acts to light the correct light source in order to show/project the proper image (i.e., the one corresponding to the user input via a user input interface 116), and a position determination assembly is not needed.

Figure 11:
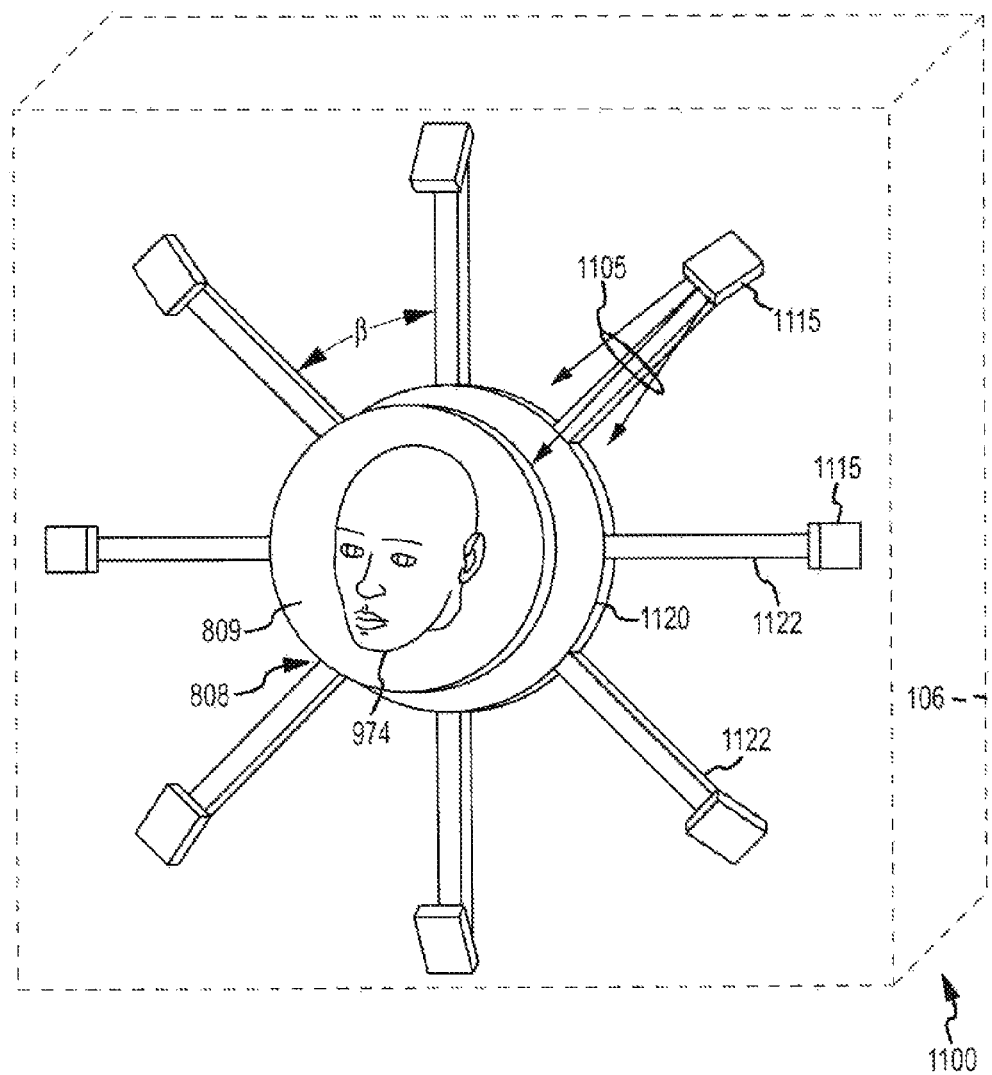
FIG. 11 illustrates another interactive zoetrope system that utilizes a holographic disc encoded with a number of holographic images useful for projecting an animated 3D image without moving parts (e.g., the disc is not rotated but is instead illuminated by a plurality of light sources spaced apart (by an angular offset) and arranged in a ring or circle about the holographic disc).

FIG. 11 illustrates a zoetrope system 1100 configured to project an interactive animated hologram 974. The system 1100 may include components shown and described in systems 100', 200, and 800 such as the input interface 116 and control system 102, with the illustrated system 1100 showing differing aspects. Specifically, the system 1100 includes a holographic disc 808 similar to that used in system 970 of FIGS. 9 and 10 with encoded images 809. However, the disc 808 in system 1100 is rigidly supported within the object support mechanism 106 such as on a front wall, and the disc 808 does not rotate such that a positioning mechanism 812 and a position determination mechanism 810 are not required or included in the system 1100.

The system 1100 includes a number of light sources 1115 (e.g., monochromatic LEDs or the like) that are supported on arms 1122 extending outward from a central plate/shield (e.g., a solid, dark-colored disc or plate) 1120 at 45 degree angular offsets, (e.g., offsets about the central axis of the holographic disc 808 that correspond to offsets used to expose master holographic images 809 into the disc 808 during manufacture to allow proper read out of the image 974).

As shown, the zoetrope 1100 includes a holographic disc 808 suspended in front of a circular array of eight (matching the number of encoded images 809 used in this particular, but non-limiting example) high-power, collimated LEDs 1115

(which may be green, for example). Each LED or other point light source 1115 is positioned at the correct (or matching) angle for the display 974 of one of the images 809 in the holographic disc 808. The LEDs 1115 may be controlled by a control system (such as systems 102 not shown in FIG. 11), which may include a single-chip, audio level meter circuit used in other zoetrope embodiments described herein. A microphone input may be used to individually activate the LEDs 1115 corresponding to a particular magnitude of audio input level. In practice, a viewer/user may be optically shielded from the direct light 1105 from the LED array or light assembly so as to prevent extraneous light from interfering with the light coming through the disc 808 from a lit one of the LEDs 1115.

When the "rotating" illumination holographic zoetrope 1100 is controlled by a human speaker, it operates very similarly to the stroboscopic holographic zoetrope 970. The holographic character 974 mimics the mouth movements of the person speaking (e.g., providing input via a user input interface such as interface 116 of FIGS. 1 and 2) so as to look as if it is speaking the same words and does so interactively in real time over any desired period of time. In other words, the images 809 are read out or projected as 3D objects 974 in an order chosen in real time based on user-provided audio input (and not based on an order used to encode the images or location of such images 809 in disc 808 so that the images 974 do not act based on a fixed and repeating script as in prior zoetropes).

The completely stationary zoetrope 1100 has several advantages. First, the period of time available to illuminate each image is much longer because there is no relative motion between the light source and the holographic image 809. This allows much brighter images 974 to be created via use of system 1100. Another advantage is that the lack of moving parts eliminates all wear and mitigates safety issues involved with viewers standing close to a spinning platform or disc. Additionally, because there are no moving parts, there is no sound produced by the system 1100 during its operation. Having completely silent operation may be desirable because the system 1100 may rely upon relatively clean audio input in some settings and silent operation may be desirable in other settings (e.g., where lack of sound heightens illusion or display effect effects provided by the system 1100). Shielding of light 1105 may be provided in one or more of the 8 directions such as by strategically placed baffles, louver sheets, and/or with other layers of holographic materials (not shown in FIG. 11).

We claim:

1. A visual display assembly for creating an interactive three dimensional (3D) animated display for a viewer, comprising:
   a projection element comprising a plurality of images;
   a positioning assembly moving the projection element through a number of positions;
   a position determination assembly determining a present one of the positions for the projection element, wherein each of the positions corresponds to one of the images;
   a light source for projecting light onto a surface of the projection element;
   an input interface receiving input from the viewer and outputting a viewer input signal;
   a controller periodically operating the light source to illuminate the projection element in response to the viewer input signal and based on the determined position of the projection element, wherein an object is projected corresponding to one of the images linked to the viewer input signal by the controller,
   wherein the viewer input signal comprises an audio signal, wherein the controller comprises a volume detector detecting a volume level of the audio signal, wherein each of images is linked with a range of volume levels, and wherein the controller selects the image to illuminate with the light source from the plurality of images based upon the determined volume level and the linking to the determined volume level.

2. The assembly of claim 1, wherein each of the objects comprises a face that is configured to represent the volume level paired with the object.

3. The assembly of claim 1, wherein the projection element comprises a holographic disc and wherein the plurality of images comprises a number of differing holographic images encoded in the holographic disc.

4. A visual display assembly for creating an interactive three dimensional (3D) animated display for a viewer, comprising:
   a projection element comprising a plurality of images;
   a positioning assembly moving the projection element through a number of positions;
   a position determination assembly determining a present one of the positions for the projection element, herein each of the positions corresponds to one of the images;
   a light source for projecting onto a surface of the projection element;
   an input interface receiving input from the viewer and outputting a viewer input signal;
   a controller periodically operating the light source to illuminate the projection element in response to the viewer input signal and based on the determined position of the projection element, herein an object is projected corresponding to one of the images linked to the viewer input signal by the controller,
   wherein the projection element comprises a holographic disc,
   wherein the plurality of images comprises a number of differing holographic images encoded in the holographic disc, and
   wherein the positioning assembly rotates the holographic disc through the number of positions, wherein the positions are angular offsets corresponding to angular positions of the holographic disc during exposure to encode each of the holographic images, and wherein the light source is operated for a time duration selected so as to illuminate only one of the holographic images per revolution of the holographic disc.

5. The assembly of claim 4, wherein the plurality of images includes at least four different ones of the holographic images corresponding to differing states of an object.

6. The assembly of claim 5, wherein the controller is operable to illuminate the holographic images in a sequence chosen based upon the viewer input signal to project an animated 3D image defined by the sequence and the differing states of the object.

7. A system for providing an interactive animated display, the system comprising:
   a holographic disc comprising a number of holographic images encoded therein at a like number of angularly offset positions; wherein each of the holographic images comprises a representation of an object in a differing state;
   a lighting assembly comprising a number of light sources focused upon a surface of the holographic disc, wherein the number of light sources matches the number of holographic images and wherein one of the light sources is associated with each of offset positions to read out one of the holographic images; and a control system configured to selectively operate the light sources; and an input interface that is operable to receive a first external signal and a second external signal;

wherein the control system selects a first one of the light sources to operate based on the first external signal and a second one of the light sources to operate based on the second external signal to project an animated hologram from the holographic disc.

8. The system of claim 7, wherein the input interface receives audio signals and wherein volume of the audio signals associated with the first and second external signals is processed to choose the first and second light sources to illuminate first and second ones of the holographic images.

9. The system of claim 8, wherein the first and second ones of the holographic images are non-sequential ones of the holographic images encoded in the holographic disc.

10. The system of claim 7, wherein the number of holographic images comprises eight and wherein the offset positions are about 45 degrees apart.

11. The system of claim 7, wherein the object comprises a character head and the differing states comprise unique positions of the character head during speech ranging from a shut mouth to an open mouth.

12. The system of claim 7, wherein the light sources are arranged in a ring with about a central axis of the holographic disc and wherein the light sources comprise monochromatic light emitting diodes.

13. A method for creating an interactive three dimensional (3D) animated display for a viewer, the method comprising:

rotating a holographic disc encoded with a plurality of holographic images;

receiving an input signal from the viewer; and in response to the receiving, operating a light source mounted proximate to the holographic disc to illuminate a surface of the holographic disc to project a 3D hologram associated with one of the holographic images, the one of the holographic images chosen based upon the input signal, wherein the holographic disc is rotated at a rotation rate of at least about 15 revolutions per second and wherein the light source is operated for a time duration of less than about 300 microseconds, so as to illuminate only one of the objects per revolution of the holographic disc.

14. The method of claim 13, wherein the receiving step includes receiving an audio signal, and wherein the operating step includes detecting a volume level of the audio signal, the choosing of the one of the holographic images being dependent upon the detected volume level.

15. The method of claim 13, wherein duration of the operating is short enough in duration to only cause one of the holographic images to be illuminated per revolution of the holographic disk about its central axis.

16. The method of claim 13, further comprising determining an angular position of the holographic disc, wherein a timing of the operating steps is selected to match when the angular position corresponds to the one of the holographic images being oriented relative to the light source to project the 3D hologram.

17. The method of claim 13, wherein the receiving step includes receiving the input signal from the viewer over a plurality of revolutions of the holographic disc and wherein the operating step includes operating the light source to illuminate one of the holographic images in response to the viewer input signal for each of the revolutions of the holographic disc, whereby differing ones of 3D holograms are projected based on receiving differing ones of the viewer input signals to produce the interactive 3D animated display.

18. The method of claim 13, wherein the holographic images are encoded into the holographic disc at angular offsets, each of the holographic images being separately projectable via operating the light source at a range of orientations of the holographic disc relative to the light source, and wherein the light source is arranged to illuminate the surface of the holographic disk with off-axis light corresponding to a reference angle used to encode the holographic images.

19. A method for creating an interactive three dimensional (3D) animated display for a viewer, the method comprising:

rotating a holographic disc encoded with a plurality of holographic images;

receiving an input signal from the viewer; and in response to the receiving, operating a light source mounted proximate to the holographic disc to illuminate a surface of the holographic disc to project a 3D hologram associated with one of the holographic images, the one of the holographic images chosen based upon the input signal, wherein the receiving step includes receiving the input signal from the viewer over a plurality of revolutions of the holographic disc and wherein the operating step includes operating the light source to illuminate one of the holographic images in response to the viewer input signal for each of the revolutions of the holographic disc, whereby differing ones of 3D holograms are projected based on receiving differing ones of the viewer input signals to produce the interactive 3D animated display.

20. The method of claim 19, wherein the receiving step includes receiving an audio signal, and wherein the operating step includes detecting a volume level of the audio signal, the choosing of the one of the holographic images being dependent upon the detected volume level.

21. The method of claim 19, wherein duration of the operating is short enough in duration to only cause one of the holographic images to be illuminated per revolution of the holographic disk about its central axis.

22. The method of claim 19, further comprising determining an angular position of the holographic disc, wherein a timing of the operating steps is selected to match when the angular position corresponds to the one of the holographic images being oriented relative to the light source to project the 3D hologram.

23. The method of claim 19, wherein the holographic images are encoded into the holographic disc at angular offsets, each of the holographic images being separately projectable via operating the light source at a range of orientations of the holographic disc relative to the light source, and wherein the light source is arranged to illuminate the surface of the holographic disk with off-axis light corresponding to a reference angle used to encode the holographic images.

24. A method for creating an interactive three dimensional (3D) animated display for a viewer, the method comprising:

rotating a holographic disc encoded with a plurality of holographic images;

receiving an input signal from the viewer; and in response to the receiving, operating a light source mounted proximate to the holographic disc to illuminate a surface of the holographic disc to project a 3D hologram associated with one of the holographic images, the one of the holographic images chosen based upon the input signal, wherein the holographic images are encoded into the holographic disc at angular offsets, each of the holographic images being separately projectable via operating the light source at a range of orientations of the holographic disc relative to the light source, and wherein the light source is arranged to illuminate the surface of the holographic disk with off-axis light corresponding to a reference angle used to encode the holographic images.

25. The method of claim 24, wherein the receiving step includes receiving an audio signal, and wherein the operating step includes detecting a volume level of the audio signal, the choosing of the one of the holographic images being dependent upon the detected volume level.

26. The method of claim 24, wherein duration of the operating is short enough in duration to only cause one of the holographic images to be illuminated per revolution of the holographic disk about its central axis.

27. The method of claim 24, further comprising determining an angular position of the holographic disc, wherein a timing of the operating steps is selected to match when the angular position corresponds to the one of the holographic images being oriented relative to the light source to project the 3D hologram.

* * * * *

UNITED STATES PATENT AND TRADEMARK OFFICE
CERTIFICATE OF CORRECTION

| | | |
|---|---|---|
| PATENT NO. | : 7,940,371 B2 | Page 1 of 1 |
| APPLICATION NO. | : 12/764186 | |
| DATED | : May 10, 2011 | |
| INVENTOR(S) | : David F. Barnett, Lanny S. Smoot and Todd P. Camill | |

It is certified that error appears in the above-identified patent and that said Letters Patent is hereby corrected as shown below:

At Col. 22, line 24, delete "herein" and insert therefor --wherein--.
At Col. 22, line 26, after "projecting" insert --light--.
At Col. 22, line 33, delete "herein" and insert therefor --wherein--.

Signed and Sealed this
Twenty-first Day of June, 2011

David J. Kappos
*Director of the United States Patent and Trademark Office*